United States Patent
Papasakellariou et al.

(10) Patent No.: US 12,245,250 B2
(45) Date of Patent: Mar. 4, 2025

(54) MULTI-CELL SCHEDULING WITH REDUCED CONTROL OVERHEAD

(71) Applicant: Samsung Electronics Co., Ltd., Suwon-si (KR)

(72) Inventors: Aris Papasakellariou, Houston, TX (US); Qiongjie Lin, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 18/315,339

(22) Filed: May 10, 2023

(65) Prior Publication Data

US 2023/0309106 A1    Sep. 28, 2023

Related U.S. Application Data

(63) Continuation of application No. 17/445,373, filed on Aug. 18, 2021, now abandoned.

(60) Provisional application No. 63/081,595, filed on Sep. 22, 2020, provisional application No. 63/077,960, filed on Sep. 14, 2020.

(51) Int. Cl.
*H04W 72/23* (2023.01)

(52) U.S. Cl.
CPC .................................. *H04W 72/23* (2023.01)

(58) Field of Classification Search
CPC ...................................................... H04W 72/23
See application file for complete search history.

(56) References Cited

U.S. PATENT DOCUMENTS

| | | |
|---|---|---|
| 2019/0223164 A1 | 7/2019 | He et al. |
| 2019/0223191 A1 | 7/2019 | Kim et al. |
| 2020/0127773 A1 | 4/2020 | Papasakellariou |
| 2021/0014837 A1 | 1/2021 | Papasakellariou |
| 2022/0132537 A1* | 4/2022 | Wang .................... H04L 5/0053 |

OTHER PUBLICATIONS

"5G; NR; Physical channels and modulation (3GPP TS 38.211 version 16.2.0 Release 16)", ETSI TS 138 211 V16.2.0, Jul. 2020, 136 pages.
"5G; NR; Multiplexing and channel coding (3GPP TS 38.212 version 16.2.0 Release 16)", ETSI TS 138 212 V16.2.0, Jul. 2020, 154 pages.

(Continued)

*Primary Examiner* — Ronald B Abelson

(57) ABSTRACT

Methods and apparatuses for multi-cell scheduling with reduced control overhead. A method for receiving physical downlink control channels (PDCCHs) includes receiving information for a first group of N1 cells and for a second group of N2 cells, determining a total number of PDCCH receptions in a slot on a scheduling cell based on N1 and on a ratio of N2 over M, and receiving a number of PDCCHs in the slot on the scheduling cell that is not larger than the total number. A PDCCH provides a downlink control information (DCI) format. The DCI format schedules one of: a physical downlink shared channel (PDSCH) reception, or a physical uplink shared channel (PUSCH) transmission, on one cell from the first group of N1 cells, or PDSCH receptions, or PUSCH transmissions, on a number of cells up to a maximum of M cells from the second group of N2 cells.

20 Claims, 16 Drawing Sheets

(56) References Cited

OTHER PUBLICATIONS

"5G; NR; Physical layer procedures for control (3GPP TS 38.213 version 16.2.0 Release 16)", ETSI TS 138 213 V16.2.0, Jul. 2020, 180 pages.
"5G; NR; Physical layer procedures for data (3GPP TS 38.214 version 16.2.0 Release 16)", ETSI TS 138 214 V16.2.0, Jul. 2020, 167 pages.
"5G; NR; Medium Access Control (MAC) protocol specification (3GPP TS 38.321 version 16.1.0 Release 16)", ETSI TS 138 321 V16.1.0, Jul. 2020, 153 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
International Search Report and Written Opinion issued Dec. 17, 2021 regarding International Application No. PCT/KR2021/012531, 6 pages.
Qualcomm Incorporated, "Views on multi-cell PDSCH scheduling via a single DCI", 3GPP TSG-RAN WG1 #102-e, R1-2006834, Aug. 2020, 5 pages.
Huawei et al., "Discussion on the PDCCH of P(S)Cell/SCell scheduling PDSCH on multiple cells using a single DCI", 3GPP TSG-RAN WG1 #102-e, R1-2006413, Aug. 2020, 9 pages.
Nokia et al., "On support of Single DCI scheduling two cells", 3GPP TSG-RAN WG1 #102-e, R1-2005909, Aug. 2020, 3 pages.
Extended European Search Report issued Jan. 3, 2024 regarding Application No. 21867198.0, 11 pages.

\* cited by examiner

MULTI-CELL SCHEDULING WITH REDUCED CONTROL OVERHEAD

CROSS-REFERENCE TO RELATED APPLICATION AND CLAIM OF PRIORITY

This application is a continuation of U.S. patent application Ser. No. 17/445,373, filed on Aug. 18, 2021, which claims priority under 35 U.S.C. § 119(e) to U.S. Provisional Patent Application No. 63/077,960 filed on Sep. 14, 2020, and U.S. Provisional Patent Application No. 63/081,595 filed on Sep. 22, 2020. The above-identified provisional patent applications are hereby incorporated by reference in their entirety.

TECHNICAL FIELD

The present disclosure relates generally to wireless communication systems and, more specifically, the present disclosure relates to multi-cell scheduling with reduced control overhead.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to multi-cell scheduling with reduced control overhead.

In one embodiment, a method for receiving physical downlink control channels (PDCCHs) is provided. The method includes receiving information for a first group of N1 cells and for a second group of N2 cells, determining a total number of PDCCH receptions in a slot on a scheduling cell based on N1 and on a ratio of N2 over M, and receiving a number of PDCCHs in the slot on the scheduling cell that is not larger than the total number. A PDCCH provides a downlink control information (DCI) format. The DCI format schedules one of: a physical downlink shared channel (PDSCH) reception, or a physical uplink shared channel (PUSCH) transmission, on one cell from the first group of N1 cells, or PDSCH receptions, or PUSCH transmissions, on a number of cells up to a maximum of M cells from the second group of N2 cells. M is larger than one.

In another embodiment, a user equipment (UE) is provided. The UE includes a transceiver configured to receive information for a first group of N1 cells and for a second group of N2 cells. A PDCCH provides a DCI format. The DCI format schedules one of: a physical downlink shared channel (PDSCH) reception, or a physical uplink shared channel (PUSCH) transmission, on one cell from the first group of N1 cells, or PDSCH receptions, or PUSCH transmissions, on a number of cells up to a maximum of M cells from the second group of N2 cells. M is larger than one. The UE further includes a processor operably connected to the transceiver. The processor is configured to determine a total number of PDCCH receptions in a slot on a scheduling cell based on N1 and on a ratio of N2 over M. The transceiver is further configured to receive a number of PDCCHs in the slot on the scheduling cell that is not larger than the total number.

In yet another embodiment, a base station is provided. The base station includes a transceiver configured to transmit information for a first group of N1 cells and for a second group of N2 cells. A PDCCH provides a DCI format. The DCI format schedules one of: a PDSCH transmission, or a PUSCH reception, on one cell from the first group of N1 cells, or PDSCH transmissions, or PUSCH receptions, on a number of cells up to a maximum of M cells from the second group of N2 cells. M is larger than one. The base station further includes a processor operably connected to the transceiver. The processor is configured to determine a total number of PDCCH transmissions in a slot on a scheduling cell based on N1 and on a ratio of N2 over M. The transceiver is further configured to transmit a number of PDCCHs in the slot on the scheduling cell that is not larger than the total number.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
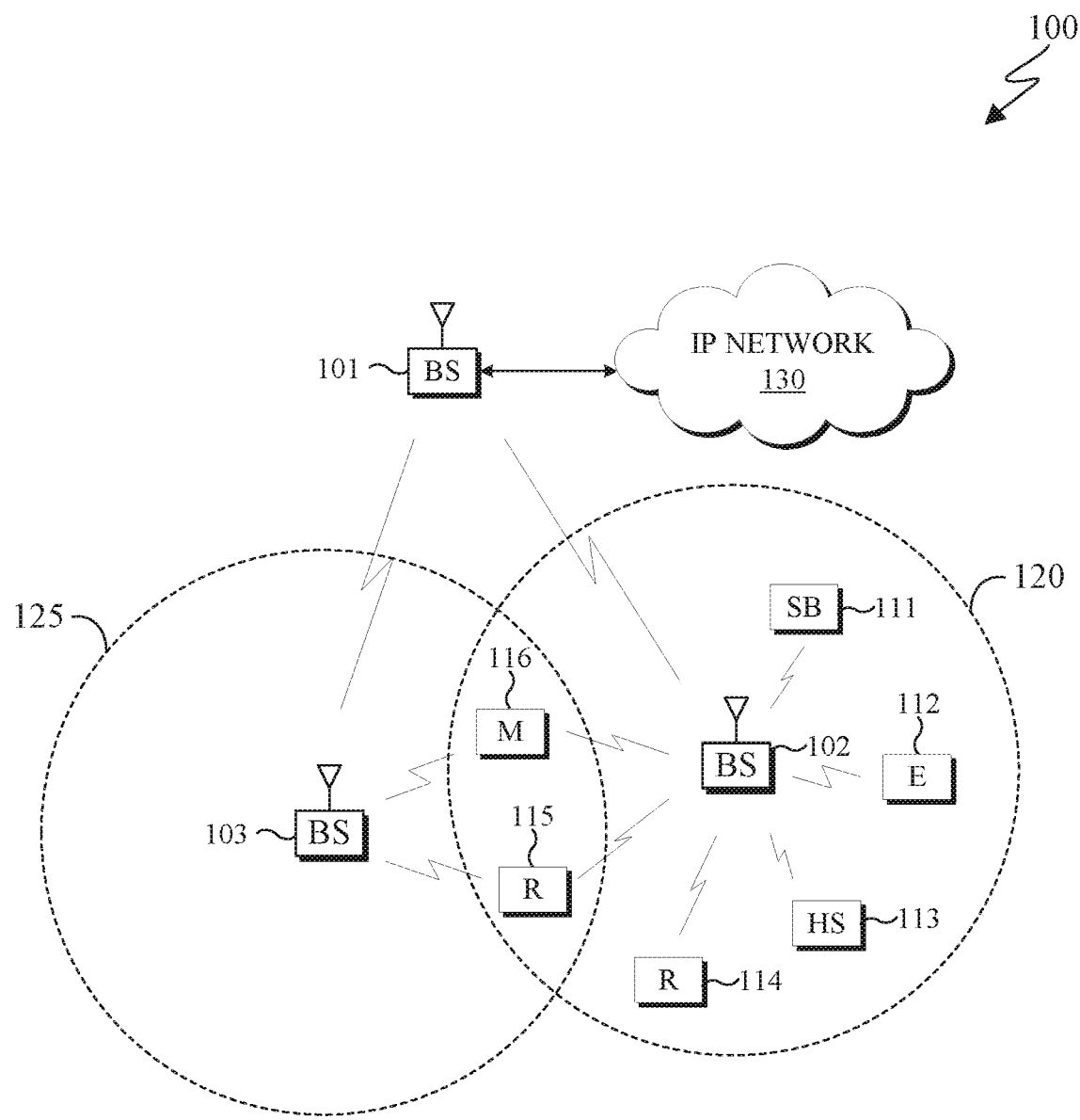
FIG. 1 illustrates an example wireless network according to embodiments of the present disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.2.0, "NR; Physical channels and modulation;" 3GPP TS 38.212 v16.2.0, "NR; Multiplexing and Channel coding;" 3GPP TS 38.213 v16.2.0, "NR; Physical Layer Procedures for Control;" 3GPP TS 38.214 v16.2.0, "NR; Physical Layer Procedures for Data;" 3GPP TS 38.321 v16.1.0, "NR; Medium Access Control (MAC) protocol specification;" and 3GPP TS 38.331 v16.1.0, "NR; Radio Resource Control (RRC) Protocol Specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems.

However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
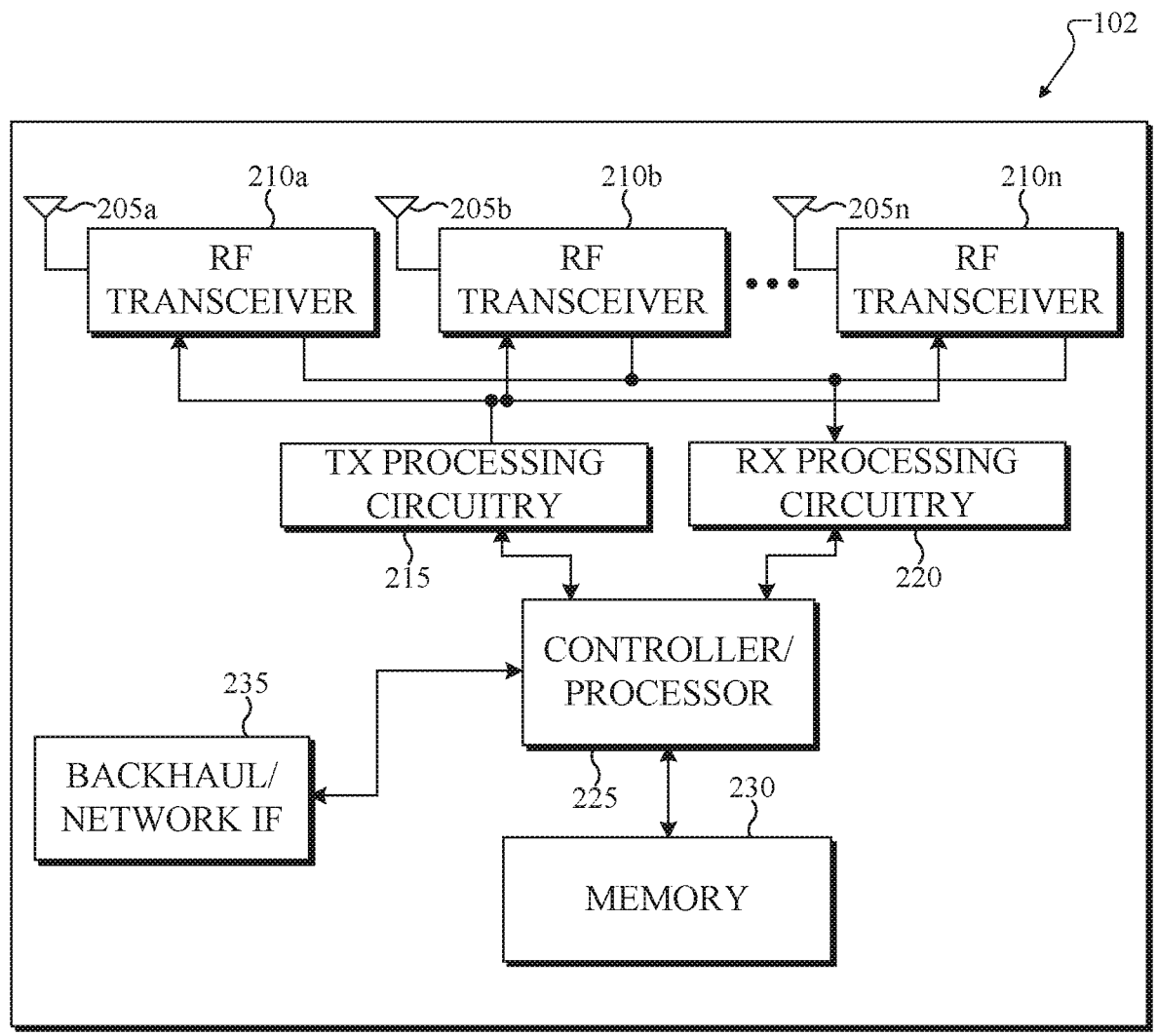
FIG. 2 illustrates an example base station (BS) according to embodiments of the present disclosure.
Figure 3:
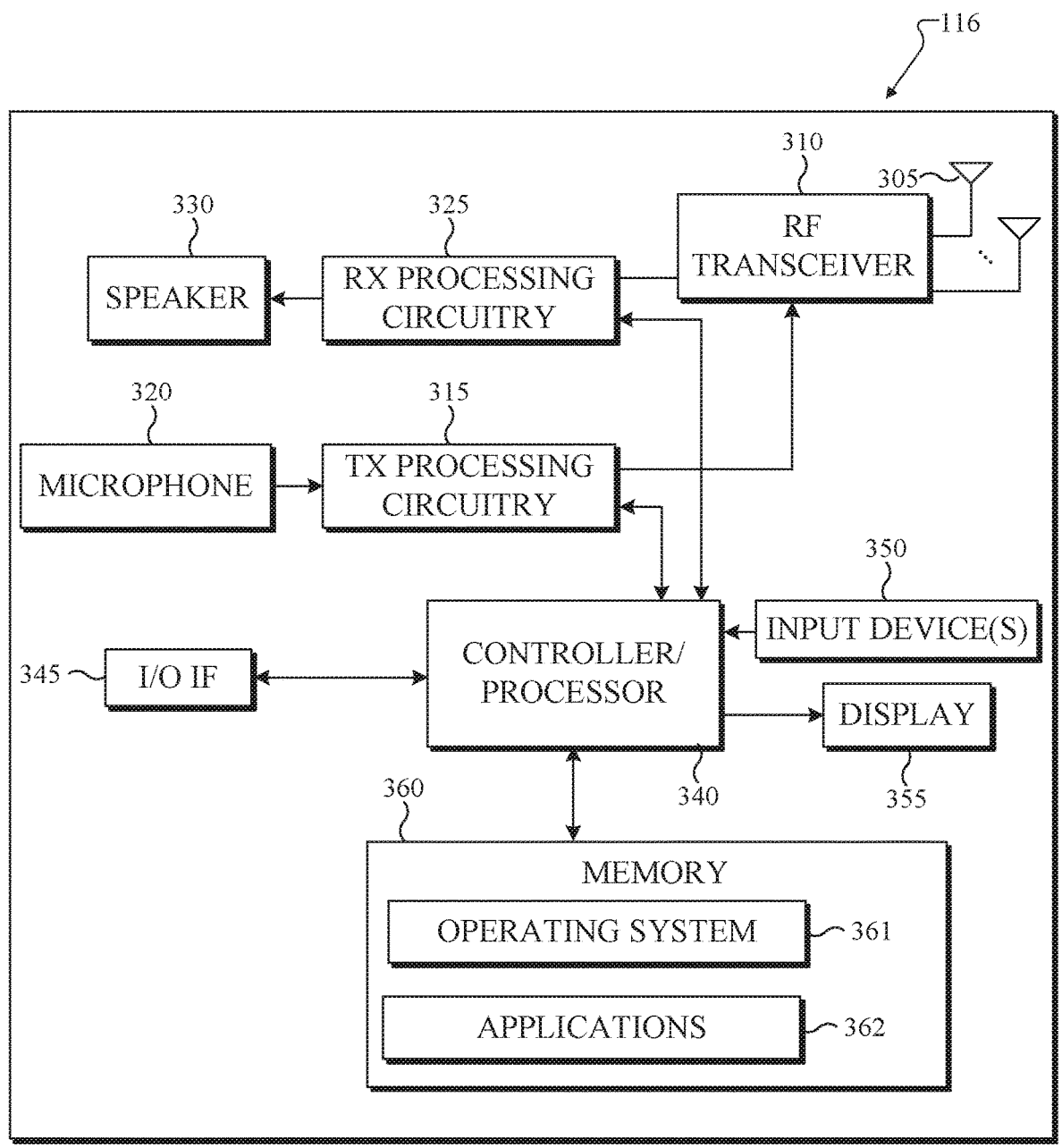
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for receiving multi-cell scheduling and PDCCH allocations. In certain embodiments, and one or more of the BSs 101-103 includes circuitry, programing, or a combination thereof for multi-cell scheduling and allocating PDCCHs.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support multi-cell scheduling and allocating PDCCH. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
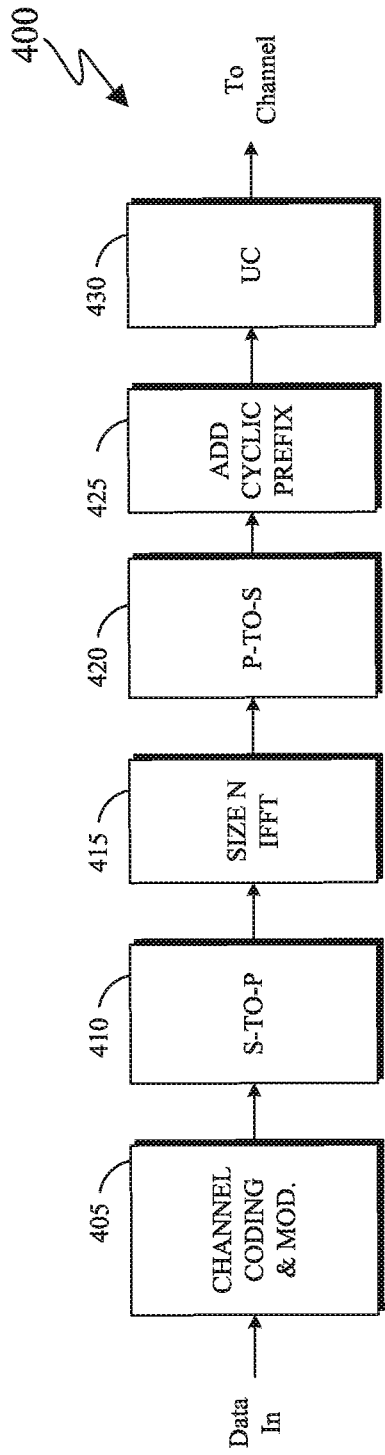
FIGS. 4 and 5 illustrate example wireless transmit and receive paths according to embodiments of the present disclosure.
Figure 5:
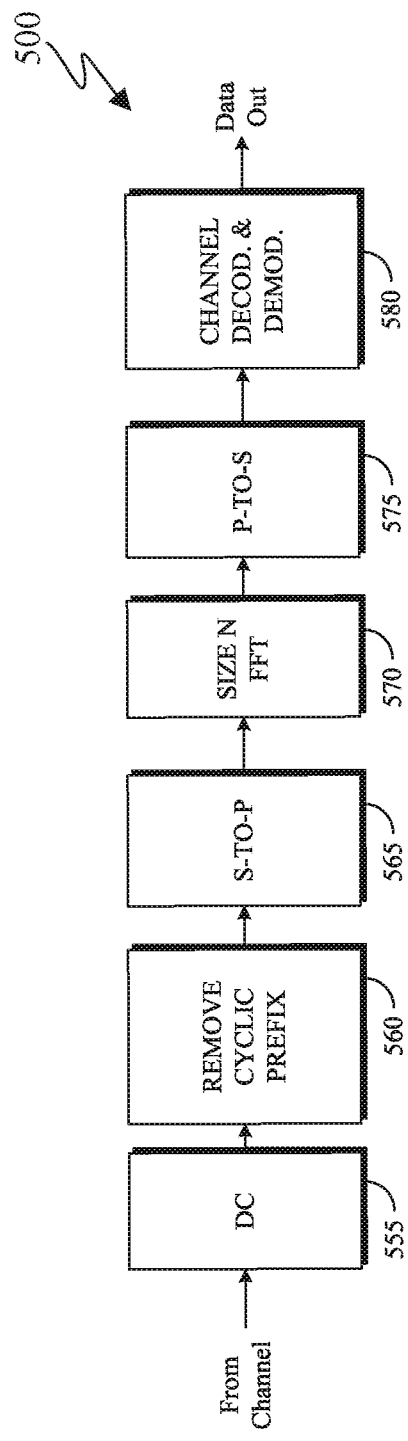

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support multi-cell scheduling and allocating PDCCHs as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for downlink (DL) signaling or for uplink (UL) signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration $\mu$ as $2^{15}$ kHz. A unit of one sub-carrier over one symbol is referred to as a resource element (RE). A unit of one RB over one symbol is referred to as a physical RB (PRB).

DL signals include data signals conveying information content, control signals conveying DL control information (DCI), reference signals (RS), and the like that are also known as pilot signals. A BS (such as the BS 102) transmits data information or DCI through respective physical DL shared channels (PDSCHs) or physical DL control channels (PDCCHs). A PDSCH or a PDCCH can be transmitted over a variable number of slot symbols including one slot symbol. A BS transmits one or more of multiple types of RS including channel state information RS (CSI-RS) and demodulation RS (DM-RS). A CSI-RS is intended for UEs (such as the UE 116) to perform measurements and provide channel state information (CSI) to a BS. For channel measurement or for time tracking, non-zero power CSI-RS (NZP CSI-RS) resources can be used. For interference measurement reports (IMRs), CSI interference measurement (CSI-IM) resources can be used. The CSI-IM resources can also be associated with a zero power CSI-RS (ZP CSI-RS) configuration. A UE can determine CSI-RS reception parameters through DL control signaling or higher layer signaling, such as radio resource control (RRC) signaling from a gNB. A DM-RS is typically transmitted only within a BW of a respective PDCCH or PDSCH and a UE can use the DM-RS to demodulate data or control information.

UL signals also include data signals conveying information content, control signals conveying UL control information (UCI), DM-RS associated with data or UCI demodulation, sounding RS (SRS) enabling a gNB to perform UL channel measurement, and a random access (RA) preamble enabling a UE (such as the UE 116) to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UCI includes hybrid automatic repeat request acknowledgement (HARQ-ACK) information, indicating correct or incorrect detection of data transport blocks (TBs) or of code block groups (CBGs) in a PDSCH, scheduling request (SR) indicating whether a UE has data in its buffer to transmit, and CSI reports enabling a gNB to select appropriate parameters for PDSCH or PDCCH transmissions to a UE. A CSI report can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, of a CSI-RS resource indicator (CRI) used to obtain the CSI report, and of a rank indicator (RI) indicating a transmission rank for a PDSCH. In certain embodiments, UL RS includes DM-RS and SRS. DM-RS is typically transmitted within a BW of a respective PUSCH or PUCCH. A gNB can use a DM-RS to demodulate information in a respective PUSCH or PUCCH. SRS is transmitted by a UE to provide a gNB with an UL CSI and, for a TDD system, to also provide a PMI for DL transmission. Further, as part of a random access procedure or for other purposes, a UE can transmit a physical random access channel (PRACH).

DL transmissions and UL transmissions can be based on an orthogonal frequency division multiplexing (OFDM) waveform including a variant using DFT precoding that is known as DFT-spread-OFDM.

Figure 6:
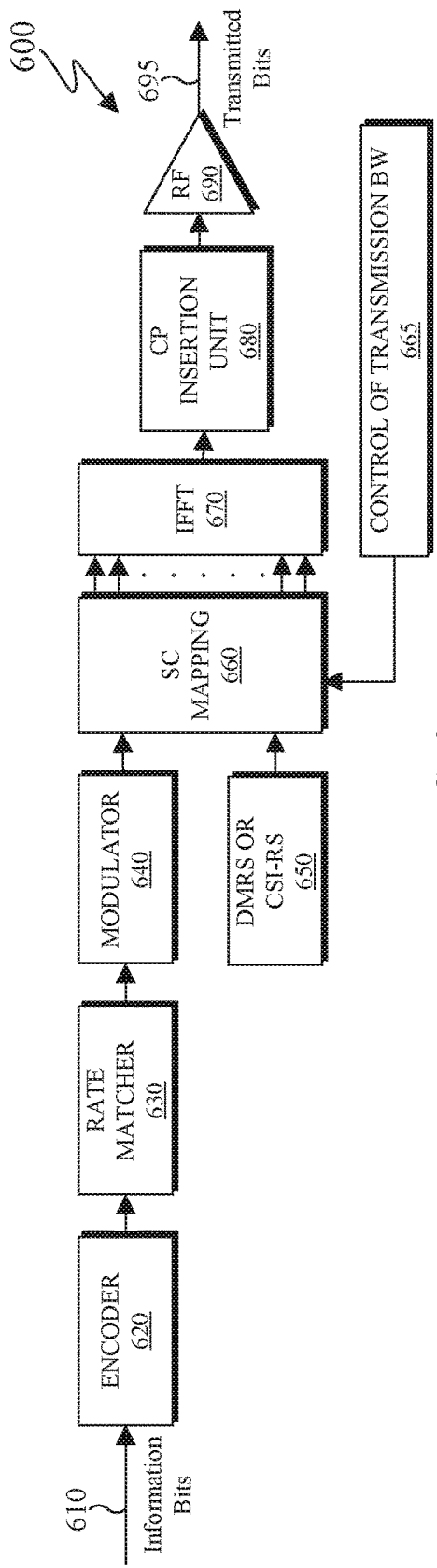
FIG. 6 illustrates a block diagram of an example transmitter structure using orthogonal frequency division multiplexing (OFDM) according to embodiments of the present disclosure.
Figure 7:
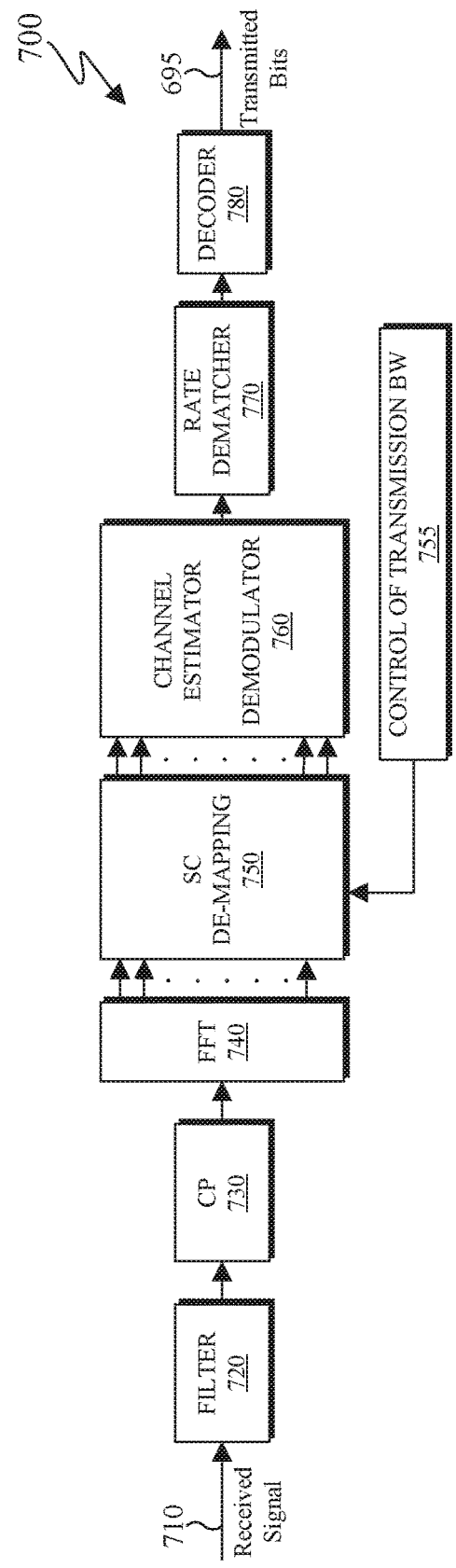
FIG. 7 illustrates a block diagram of an example receiver structure using OFDM according to embodiments of the present disclosure.

FIG. 6 illustrates a block diagram 600 of an example transmitter structure using orthogonal frequency division multiplexing (OFDM) according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 600 can be similar to the RF transceivers 210a-210n of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630, and modulated by modulator 640. Subsequently, modulated encoded symbols and DMRS or CSI-RS 650 are mapped to SCs by SC mapping unit 660 with input from BW selector unit 665, an inverse fast Fourier transform (IFFT) is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast Fourier transform (FFT), SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

In certain embodiments, a UE monitors multiple candidate locations for respective potential PDCCH receptions to decode multiple DCI formats in a slot. A DCI format includes cyclic redundancy check (CRC) bits in order for the UE to confirm a correct detection of the DCI format. A type of a DCI format is identified by a radio network temporary identifier (RNTI) that scrambles the CRC bits of the DCI format.

For a DCI format scheduling a PDSCH or a PUSCH to a single UE, the RNTI can be a cell RNTI (C-RNTI), or a configured scheduling RNTI (CS-RNTI), or an MCS-C-RNTI and serves as a UE identifier. In the following examples, the C-RNTI will be referred to when needed. A UE typically receives/monitors PDCCH for detections of DCI formats with CRC scrambled by a C-RNTI according to a UE-specific search space (USS).

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH providing paging information, the RNTI can be a P-RNTI. There are also a number of other RNTIs associated with DCI formats providing various control information and are monitored according to a common search space (CSS).

Figure 8:
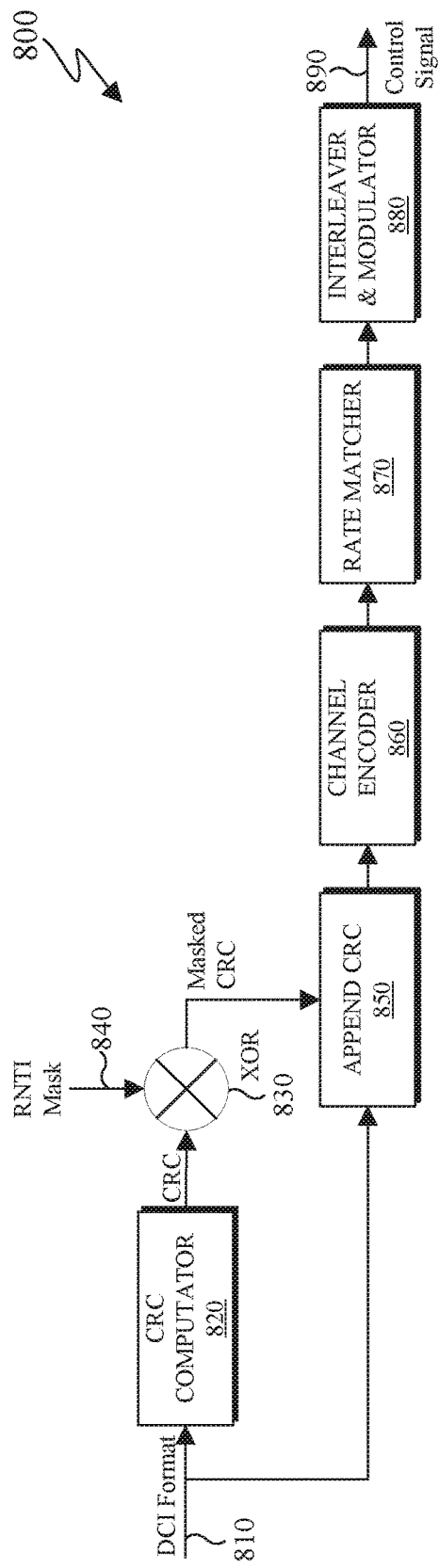
FIG. 8 illustrates an example encoding process for a downlink control information (DCI) format according to embodiments of the present disclosure.
Figure 9:
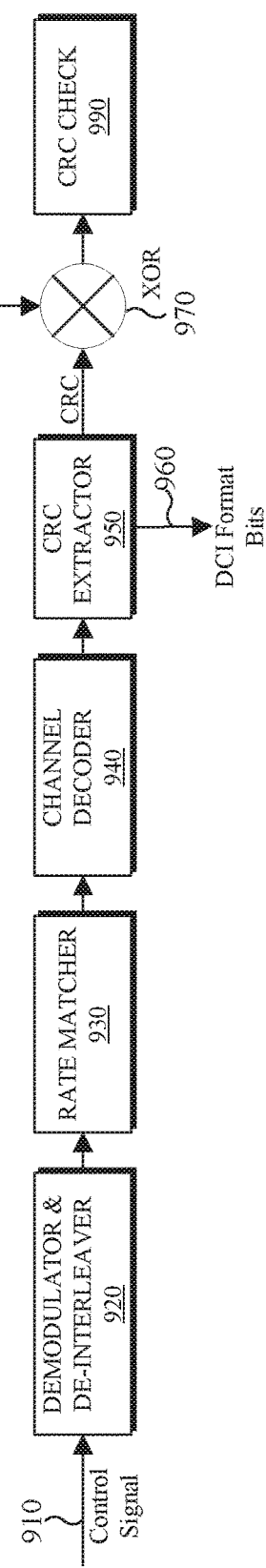
FIG. 9 illustrates an example decoding process for a DCI format for use with a UE according to embodiments of the present disclosure.

FIG. 8 illustrates an example encoding process 800 for a downlink control information (DCI) format according to embodiments of the present disclosure. FIG. 9 illustrates an example decoding process 900 for a DCI format for use with a UE according to embodiments of the present disclosure. The encoding process 800 of FIG. 8 and the decoding process 900 of FIG. 9 are for illustration only and other embodiments can be used without departing from the scope of the present disclosure.

A BS separately encodes and transmits each DCI format in a respective PDCCH. When applicable, a RNTI for a UE that a DCI format is intended for masks a CRC of the DCI format codeword in order to enable the UE to identify the DCI format. For example, the CRC can include 16 bits or 24 bits and the RNTI can include 16 bits or 24 bits. Otherwise, when a RNTI is not included in a DCI format, a DCI format type indicator field can be included in the DCI format.

As illustrated in FIG. 8, the CRC of (non-coded) DCI format bits 810 is determined using a CRC computation unit 820, and the CRC is masked using an exclusive OR (XOR) operation unit 830 between CRC bits and RNTI bits 840. The XOR operation is defined as XOR(0,0)=0, XOR(0,1)=1, XOR(1,0)=1, XOR(1,1)=0. The masked CRC bits are appended to DCI format information bits using a CRC append unit 850. An encoder 860 performs channel coding (such as tail-biting convolutional coding or polar coding), followed by rate matching to allocated resources by rate matcher 870. Interleaving and modulation units 880 apply interleaving and modulation, such as QPSK, and the output control signal 890 is transmitted.

As illustrated in FIG. 9, a received control signal 910 is demodulated and de-interleaved by a demodulator and a de-interleaver 920. A rate matching applied at a BS transmitter is restored by rate matcher 930, and resulting bits are decoded by decoder 940. After decoding, a CRC extractor 950 extracts CRC bits and provides DCI format information bits 960. The DCI format information bits are de-masked 970 by an XOR operation with a RNTI 980 (when applicable) and a CRC check is performed by unit 990. When the CRC check succeeds (check-sum is zero), the DCI format information bits are considered to be valid. When the CRC check does not succeed, the DCI format information bits are considered to be invalid.

Table 1, below, describes fields for a DCI format 1_2 scheduling a PDSCH reception by a UE on a single cell.

TABLE 1

Fields of DCI format 1_2

| Information field | Number of bits |
|---|---|
| Identifier for DCI formats | 1 |
| Carrier indicator | 0, 1, 2, 3 |
| Bandwidth part (BWP) indicator | 0, 1, 2 |
| PRB bundling size indicator | 0, 1 |
| Rate matching indicator | 0, 1, 2 |
| Zero power (ZP) CSI-RS trigger | 0, 1, 2 |
| Frequency domain resource allocation (FDRA) | Variable |
| Time domain resource allocation (TDRA) | 0, 1, 2, 3, 4 |
| Modulation and coding scheme (MCS) | 5 |
| New data indicator (NDI) | 1 |
| Redundancy version (RV) | 0, 1, 2 |
| HARQ process number | 0, 1, 2, 3, 4 |
| VRB-to-PRB mapping | 0 or 1 |
| Downlink assignment index (DAI) | 0, 1, 2, 4 |
| TPC command for PUCCH | 2 |
| PUCCH resource indicator (PRI) | 0, 1, 2, 3 |
| PDSCH-to-HARQ-ACK timing | 0, 1, 2, 3 |
| Antenna port(s) | 0, 4, 5, 6 |
| SRS request | 0, 1, 2, 3 |
| DMRS sequence initialization | 0, 1 |
| Transmission configuration indication (TCI) | 0, 1, 2, 3 |
| CBG Transmission information (CBGTI) | 0, 1, 2, 3 |
| CBG flushing out information (CBGFI) | 0, 1 |
| CRC | 24 |

Table 2 below describes fields for a DCI format 0_2 scheduling a PUSCH transmission from a UE on a single cell.

TABLE 2

Fields of DCI format 0_2

| Information field | Number of bits |
|---|---|
| Identifier for DCI formats | 1 |
| Carrier indicator | 0, 1, 2, 3 |
| UL/SUL indicator | 0, 1 |
| Bandwidth part (BWP) indicator | 0, 1, 2 |
| Frequency domain resource allocation (FDRA) | Variable |
| Time domain resource allocation (TDRA) | 0, 1, 2, 3, 4 |
| Frequency hopping (FH) flag | 0, 1 |
| Modulation and coding scheme (MCS) | 5 |
| New data indicator (NDI)S | 1 |
| Redundancy version (RV) | 0, 1, 2 |
| HARQ process number | 0, 1, 2, 3, 4 |
| Downlink assignment index (DAI) | 0, 1, 2, 4 |
| TPC command for PUSCH | 2 |
| SRS resource indicator (SRI) | Variable |
| Precoding information and number of layers | 0, 1, 2, 3, 4, 5, 6 |
| Antenna port(s) | 0, 2, 3, 4, 5 |
| SRS request | 0, 1, 2, 3 |
| CSI request | 0, 1, 2, 3, 4, 5, 6 |
| PTRS-DMRS association | 0,2 |
| beta_offset indicator | 0, 1, 2 |
| DMRS sequence initialization | 0, 1 |
| UL-SCH indicator | 1 |
| Open-loop power control (OLPC) parameter set indication | 0, 1, 2 |
| CRC | 24 |

In certain embodiments, a PDCCH transmission can be within a set of PRBs. A BS can configure a UE with one or more sets of PRB sets, also referred to as control resource sets (CORESETs), for PDCCH receptions. A PDCCH reception can be in control channel elements (CCEs) that are included in a CORESET.

A UE can monitor PDCCH according to a first PDCCH monitoring type or according to a second PDCCH monitoring type. For the first PDCCH monitoring type that corresponds to a UE capability for PDCCH monitoring per slot, a maximum number of PDCCH candidates $M_{PDCCH}^{max,slot,\mu}$ and a maximum number of non-overlapping CCEs $C_{PDCCH}^{max,slot,\mu}$ for the reception of PDCCH candidates is defined per slot. Non-overlapping CCEs are CCEs with different indexes or in different symbols of a CORESET or in different CORESETs.

In certain embodiments, if a UE (such as the UE 116) can support a first set of $N_{cells,0}^{DL}$ serving cells and a second set of $N_{cells,1}^{DL}$ serving cells, then the UE determines, for the purpose of reporting pdcch-BlindDetectionCA, a number of serving cells as $N_{cells,0}^{DL}+R \cdot N_{cells,1}^{DL}$ where R is a value reported by the UE. In this embodiment, (i) first set of $N_{cells,0}^{DL}$ serving cells where the UE is either not provided CORESETPoolIndex or is provided CORESETPoolIndex with a single value for all CORESETs on all DL BWPs of each serving cell from the first set of serving cells and (ii) the second set of $N_{cells,1}^{DL}$ serving cells is associated where the UE is provided CORESETPoolIndex with a value 0 for a first CORESET and with a value 1 for a second CORESET on any DL BWP of each serving cell from the second set of serving cells.

In certain embodiments, if a UE (such as the UE 116) is (i) is configured with $N_{cells,0}^{DL,\mu}+N_{cells,1}^{DL,\mu}$ downlink cells, (ii) associated PDCCH candidates monitored in the active DL BWPs of the scheduling cell(s) using SCS configuration µ, where $$\sum_{\mu=0}^{3} \left(N_{cells,0}^{DL,\mu} + \gamma \cdot N_{cells,1}^{DL,\mu}\right) > N_{cells}^{cap},$$

and (iii) a DL BWP of an activated cell is the active DL BWP of the activated cell, and a DL BWP of a deactivated cell is the DL BWP with index provided by firstActiveDownlinkBWP-Id for the deactivated cell, then the UE is not required to monitor more than $$m_{PDCCH}^{total,slot,\mu} = \left\lfloor N_{cells}^{cap} \cdot M_{PDCCH}^{max,slot,\mu} \cdot (N_{cells,0}^{DL,\mu} + \gamma \cdot N_{cells,1}^{DL,\mu}) / \sum_{j=0}^{3} (N_{cells,0}^{DL,j} + \gamma \cdot N_{cells,1}^{DL,j}) \right\rfloor PDCCH$$

candidates or more than $$C_{PDCCH}^{total,slot,\mu} = \left\lfloor N_{cells}^{cap} \cdot C_{PDCCH}^{max,slot,\mu} \cdot (N_{cells,0}^{DL,\mu} + \gamma \cdot N_{cells,1}^{DL,\mu}) / \sum_{j=0}^{3} (N_{cells,0}^{DL,j} + \gamma \cdot N_{cells,1}^{DL,j}) \right\rfloor$$

non-overlapped CCEs per slot on the active DL BWP(s) of scheduling cell(s) from the $N_{cells,0}^{DL,\mu} + N_{cells,1}^{DL,\mu}$ downlink cells. In this example, $N_{cells}^{cap}$ is equal to 4 or is a capability reported by the UE. Additionally, in this example, $\gamma$ is a value that is provided by higher layers to the UE or is R.

For each scheduled cell, the UE is not required to monitor on the active DL BWP with SCS configuration $\mu$ of the scheduling cell from the $N_{cells,1}^{DL,\mu}$ downlink cells more than min($M_{PDCCH}^{max,slot,\mu}$, $M_{PDCCH}^{total,slot,\mu}$) PDCCH candidates or more than min($C_{PDCCH}^{max,slot,\mu}$, $C_{PDCCH}^{totalslot,\mu}$) non-overlapped CCEs per slot.

Similar, for each scheduled cell, the UE is not required to monitor on the active DL BWP with SCS configuration $\mu$ of the scheduling cell from the $N_{cells,1}^{DL,\mu}$ downlink cells more than min($\gamma$ $M_{PDCCH}^{max,slot,\mu}$, $M_{PDCCH}^{total,slot,\mu}$) PDCCH candidates or more than min($C_{PDCCH}^{max,slot,\mu}$, $C_{PDCCH}^{total,slot,\mu}$) non-overlapped CCEs per slot. Additionally, for each scheduled cell, the UE is not required to monitor on the active DL BWP with SCS configuration $\mu$ of the scheduling cell from the $N_{cells,1}^{DL,\mu}$ downlink cells more than min($M_{PDCCH}^{max,slot,\mu}$, $M_{PDCCH}^{total,slot,\mu}$) PDCCH candidates or more than min($C_{PDCCH}^{max,slot,\mu}$, $C_{PDCCH}^{total,slot,\mu}$) non-overlapped CCEs per slot for CORESETs with same CORESETPoolIndex value. If a CORESETPoolIndex is not provided for a cell or if a single CORESETPoolIndex is provided for a cell, then $\gamma=0$.

In certain embodiments, a UE determines CCEs for decoding a PDCCH candidate based on a search space. For some RNTIs, such as a C-RNTI, a set of PDCCH candidates for respective DCI formats define corresponding UE-specific search space sets. For other RNTIs, such as a SI-RNTI, a set of PDCCH candidates for respective DCI formats define corresponding common search space sets (CSS sets). A search space set is associated with a CORESET where the UE monitors PDCCH candidates for the search space set. A UE expects to monitor PDCCH candidates for up to 4 sizes of DCI formats that include up to 3 sizes of DCI formats with CRC scrambled by C-RNTI or MCS-C-RNTI per serving cell. The UE can count a number of sizes for DCI formats per serving cell based on a number of configured PDCCH candidates in respective search space sets for the corresponding active DL BWP.

In certain embodiments, for cross-carrier scheduling, the number of PDCCH candidates for monitoring and the number of non-overlapped CCEs per span or per slot are separately counted for each scheduled cell.

For a search space set s associated with CORESET p, the CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ are given by Equation (1), below. As described in Equation (1), for any CSS, $Y_{p,n_{s,f}^{\mu}}=0$. Similar, for a USS, $Y_{p,n_{s,f}^{\mu}}=(A_p \cdot Y_{p,n_{s,f}^{\mu}-1}) \bmod D$, $Y_{p,-1}=n_{RNTI}\neq 0$, $A_p=39827$ for pmod3=0, $A_p=39829$ for pmod3=1, $A_p=39839$ for pmod3=2, and D=65537. Additionally, as described in Equation (1), i=0, ..., L−1, and $N_{CCE,p}$ is a number of CCEs, numbered from 0 to $N_{CCE,p}-1$, in CORESET p. Similar, $n_{CI}$ is a carrier indicator field value if the UE is configured with a carrier indicator field for the serving cell on which PDCCH is monitored; otherwise, including for any CSS, $n_{CI}=0$. The expression $m_{s,n_{CI}}^{(L)}$ as described in Equation (1), illustrates that $m_{s,n_{CI}}=0, \ldots, M_{s,n_{CI}}^{(L)}-1$, where $M_{s,n_{CI}}^{(L)}$ is the number of PDCCH candidates the UE is configured to monitor for aggregation level L of a search space set s for a serving cell corresponding to $n_{CI}$. For a USS, $M_{s,max}^{(L)}$ is the maximum of $M_{s,n_{CI}}^{(L)}$ over all configured $n_{CI}$ values for a CCE aggregation level L of search space set s. Further, the RNTI value used for $n_{RNTI}$ is the C-RNTI.

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i \quad (1)$$

In certain embodiments, a UE (such as the UE 116) monitors PDCCH according to a CSS for scheduling a PDSCH providing system information, random access response, or paging only on one cell that is referred to as primary cell. The UE transmits PUCCH only on the primary cell. In certain embodiments, the UE is configured as a primary secondary cell (PSCell) for PUCCH transmissions. When the UE is configured as a PSCell, the UE transmits PUCCH on the primary cell for a master/primary cell group and transmits PUCCH on the PSCell for a secondary cell group. For brevity, the embodiments descriptions of this disclosure considers the primary cell, but the embodiments can be directly extended to a PSCell.

In certain embodiments, an ability of a gNB (such as the BS 102) to schedule a UE (such as the UE 116) on a cell depends on a maximum PDCCH monitoring capability of the UE for scheduling on the cell as defined by min($M_{PDCCH}^{max,slot,\mu}$, $M_{PDCCH}^{max,slot,\mu}$) PDCCH candidates and min($C_{PDCCH}^{max,slot,\mu}$, $C_{PDCCH}^{max,slot,\mu}$) non-overlapped CCEs per slot for a scheduling cell from the $N_{cells,0}^{DL,\mu}$ downlink cells or by min($\gamma \cdot M_{PDCCH}^{max,slot,\mu}$, $M_{PDCCH}^{max,slot,\mu}$) PDCCH candidates and min($\gamma \cdot C_{PDCCH}^{max,slot,\mu}$, $C_{PDCCH}^{max,slot,\mu}$) for a scheduling cell from the $N_{cells,1}^{DL,\mu}$ downlink cells. While $M_{PDCCH}^{max,slot,\mu}$ and $C_{PDCCH}^{max,slot,\mu}$ are predetermined numbers for a SCS configuration $\mu$, $M_{PDCCH}^{max,slot,\mu}$ and $C_{PDCCH}^{max,slot,\mu}$ are variable and depend on a total number of cells for SCS configuration $\mu$, $N_{cells,0}^{DL,\mu}+\gamma \cdot N_{cells,1}^{DL,\mu}$, and on a total number of cells across all SCS configurations $\sum_{j=0}^{3}(N_{cells,0}^{DL,j}+\gamma \cdot N_{cells,1}^{DL,j})$. Determining $M_{PDCCH}^{max,slot,\mu}$ and $C_{PDCCH}^{max,slot,\mu}$ based on a number of configured cells results to an under-dimensioning of the PDCCH monitoring capability of the UE as, at a given time, the UE can deterministically know that it cannot be scheduled in certain cells and therefore a corresponding PDCCH monitoring capability can be reallocated to other cells where scheduling can occur.

At least for initial deployments, UEs using new radio (NR) radio access technology (NR UEs) coexist with legacy UEs using long-term evolution (LTE) radio access technology (LTE UEs) in a same network. To enable such coexistence in a same spectrum, dynamic spectrum sharing (DSS) is used where NR UEs and LTE UEs share a same channel and a network can dynamically allocate resources among LTE UEs and NR UEs. During certain time instances (slots for NR or subframes for LTE), a network may allocate most of the DL resources to LTE UEs while typically UL spectrum is not fully utilized and can be used for transmission from either NR UEs or LTE UEs. It is also possible that some DL spectrum can be available for PDSCH receptions by NR UEs. To enable such operation for NR UEs capable of carrier aggregation (CA) operation, the PDCCH receptions scheduling the PDSCH receptions on the first cell where LTE UEs and NR UEs coexist can be offloaded to a second cell where only NR UEs exist. As the first cell is typically a macro-cell providing synchronization signals and broadcast system information, it is a primary cell and the second cell is a secondary cell. However, DSS operation can also be applicable among secondary cells. In general, with DSS, an NR UE can be scheduled either from a first cell, such as a primary cell, or from a second cell such as an SCell. In the remaining of this disclosure, unless otherwise explicitly mentioned, the term UE refers to an NR UE.

Scheduling a UE on a first cell, such as a primary cell, from either the first cell or from a second cell, such as a secondary cell, creates additional conditions for PDCCH monitoring on both the primary cell and on the secondary cell. One such condition is to maintain up to 3 sizes of DCI formats with CRC scrambled by C-RNTI per serving cell for the first cell. Another condition, when the UE is configured by UE-specific RRC signaling to monitor PDCCH for detection of DCI formats according to a CSS, referred to as Type3-PDCCH CSS, on the secondary cell relates to treating the secondary cell as the primary cell with respect to overbooking the PDCCH capability of the UE on the secondary cell and then having to perform search space set dropping by prioritizing search space sets corresponding to PDCCH monitoring according to CSS.

To reduce PDCCH overhead for scheduling PDSCH receptions or PUSCH transmissions in CA operation, a single DCI format that schedules multiple PDSCH receptions by a UE or multiple PUSCH transmissions from a UE in respective multiple cells can be used. For brevity, the DCI format is referred to as DCI format 0_3 for scheduling of PUSCH transmissions or as DCI format 1_3 for scheduling of PDSCH receptions.

Compared to using multiple respective DCI formats, a DCI format 1_3 allows for having a single CRC and can also potentially allow a single value for other fields such as a PUCCH resource indicator for a PUCCH transmission with HARQ-ACK information corresponding to multiple PDSCH receptions, a PDSCH-to-HARQ-ACK timing field indicating a slot for the PUCCH transmission, a transmission power control (TPC) command field, and a downlink assignment index (DAI) field for determining a HARQ-ACK codebook. As DCI format 1_3 can be more reliably detected by a UE than a DCI format scheduling a single PDSCH reception, because a missed detection for the former results to multiple PDSCH missed receptions by the UE, it is important to maintain a small size for DCI format 1_3 in order to obtain meaningful resource savings over using multiple DCI formats for scheduling respective PDSCH receptions.

Therefore, embodiments of the present disclosure take into consideration there is a need to design a DCI format that schedules PDSCH receptions by a UE on multiple cells and provide a size for the DCI format that is substantially smaller than a proportional multiple of a size of a DCI format that schedules a PDSCH reception by the UE on a single cell.

Embodiments of the present disclosure also take into consideration that there is a need to design a DCI format that schedules PUSCH transmissions from a UE on multiple cells and provide a size for the DCI format that is substantially smaller than a proportional multiple of a size of a DCI format that schedules a PUSCH transmission from the UE on a single cell.

Additionally, embodiments of the present disclosure take into consideration that there is a need to determine a total number of PDCCH candidates and a total number of non-overlapped CCEs when a UE is configured to monitor PDCCH for detection of only DCI formats that schedule PDSCH receptions or PUSCH transmissions on multiple cells.

Accordingly, embodiments of the present disclosure relate to designing a DCI format that schedules PDSCH receptions by a UE on multiple cells and provide a size for the DCI format that is substantially smaller than a proportional multiple of a size of a DCI format that schedules a PDSCH reception by the UE on a single cell. The present disclosure also relates to designing a DCI format that schedules PUSCH transmissions from a UE on multiple cells and provide a size for the DCI format that is substantially smaller than a proportional multiple of a size of a DCI format that schedules a PUSCH transmission from the UE on a single cell. The present disclosure further relates to determining a total number of PDCCH candidates and a total number of non-overlapped CCEs when a UE is configured to monitor PDCCH for detection of only DCI formats that schedule PDSCH receptions or PUSCH transmissions on multiple cells.

Embodiments of the present disclosure describe a DCI format scheduling multiple PDSCH receptions by a UE on respective multiple cells. The following examples and embodiments describe designing a DCI format scheduling multiple PDSCH receptions by a UE on respective multiple cells.

An embodiment of this disclosure considers a design for a DCI format that schedules multiple PDSCH receptions by a UE on respective multiple cells. For brevity, such DCI format is referred to as DCI format 1_3. The exemplary embodiments consider scheduling of two PDSCH receptions on two respective DL cells but are directly applicable to any number of $M_{cells}^{max\_sched}>2$ scheduled cells.

As different cells can have different operating characteristics, such as different operating bandwidth or different duplexing method (such as frequency division duplex (FDD) or time division duplex (TDD)) and as a UE can experience different channel conditions, such as different signal-to-interference and noise ratios (SINRs), the size of each field in DCI format 13 needs to be separately configured for each cell.

A DCI format 1_3 can include same or similar fields as a DCI format 1_2. A possibility of additional field is separately considered. A configuration for a number of bits for each field can be independent per scheduled cell. A limitation of such an approach is that a total number of sizes for DCI format 1_3 can be large when a DCI format 1_3 can schedule PDSCH receptions on any combination of cells.

For example, if (i) DCI format 1_3 is restricted to schedule PDSCH receptions on two cells, (ii) a UE is configured four scheduled cells, indexed as $\{c_0, c_1, c_2, c_3\}$, for a scheduling cell, and (iii) a total size for fields in DCI format 1_3 corresponding to scheduling PDSCH receptions on each of the $\{c_0, c_1, C_2, c_3\}$ cells is $\{s_0, s_1, s_2, s_3\}$ respectively, then DCI format 1_3 can have a size that is any of the combinations that includes the sum of two values from $\{s_0, s_1, s_2, s_3\}$ (excluding CRC bits). For the present example of four scheduled cells having four separate respective total sizes for fields in DCI format 1_3, a maximum number of different sizes for DCI format 1_3 is six.

To minimize an increase in a number of sizes of DCI formats with CRC scrambled by C-RNTI that a UE is configured to decode, a size for DCI format 1_3 can be same regardless of the cells that DCI format 1_3 schedules PDSCH receptions. For example, a number of scheduled cells where DCI format 1_3 can schedule PDSCH receptions can be predetermined, such as two cells, a size of DCI format 1_3 can be configured by higher layers, and a sum of sizes for first fields and second fields associated with scheduling PDSCH receptions on first and second cells, respectively, can be assumed to be equal to the size of DCI format 13 (with padding bits used in case the sum is smaller than the total size).

Instead of configuring a size of DCI format 1_3 by explicit RRC signaling, a UE can determine a size of DCI format 1_3 based on a sum of sizes for first and second fields corresponding to scheduling two PDSCH receptions on respective two reference cells. For example, the two reference cells can be the scheduling cell and another scheduled cell with the smallest index among remaining scheduled cells, or the cells resulting to a largest value for the sum of the sizes of the corresponding first and second fields in DCI format 1_3. Alternatively, the UE can expect a total size of DCI format 1_3 to be same for scheduling two PDSCH receptions on any combination of two scheduled cells from the set of scheduled cells.

For instance, when a UE is configured four scheduled cells and a corresponding scheduling cell, wherein the indexes of the scheduled cells are 0, 1, 2, and 3, and wherein the scheduling cell has index 1, the UE determines the size of DCI format 1_3 based on the sum of the field sizes for scheduling PDSCH receptions on the cell with index 1 and of the field sizes for scheduling PDSCH receptions on the cell with index 0. For example, the UE can expect a sum of sizes for first and second fields used for scheduling respective first and second PDSCH receptions on two cells to be same for any two cells from the set of four scheduled cells.

Figure 10:
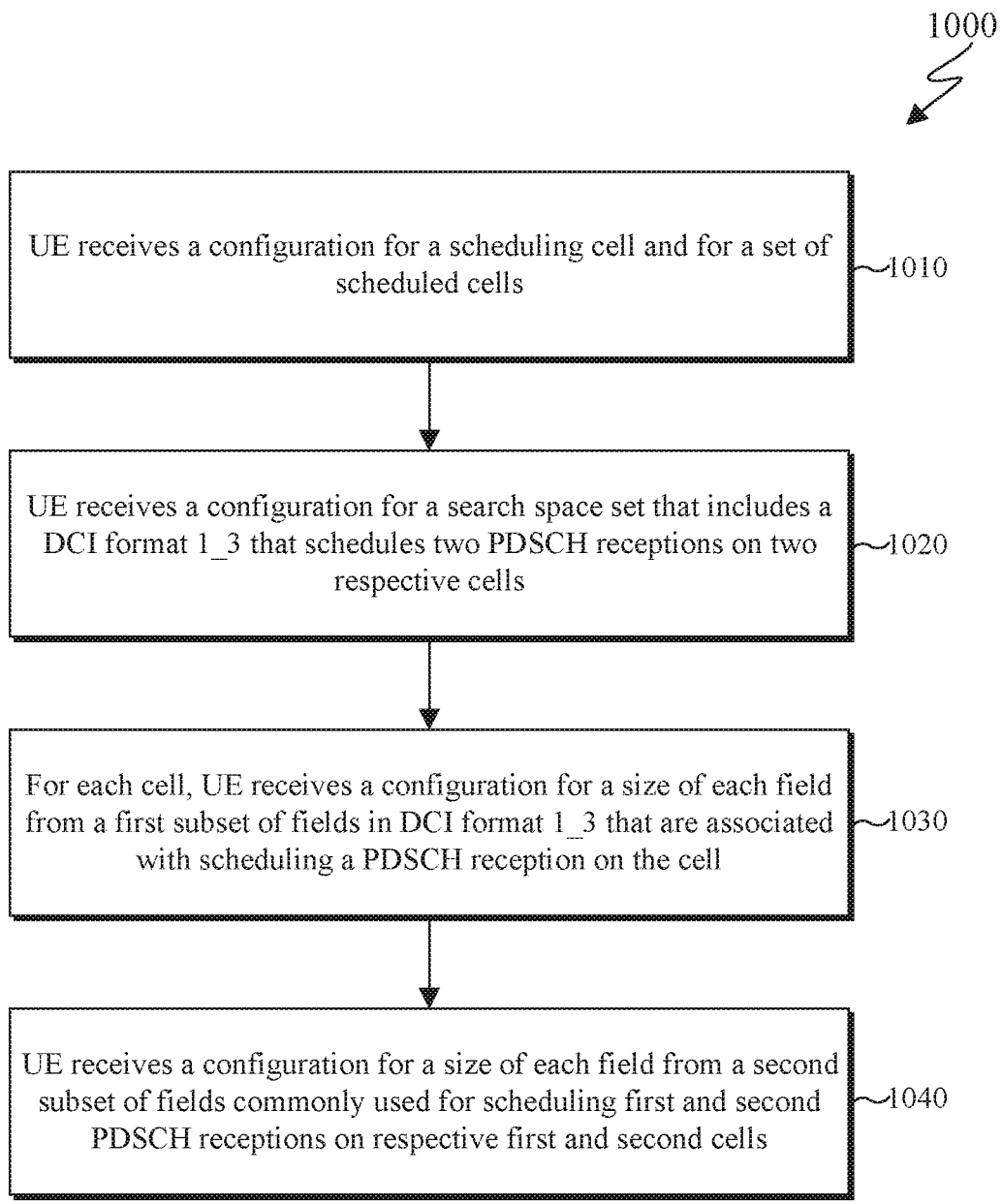
FIG. 10 illustrates an example method for a UE determining a size of a DCI format that schedules two physical downlink shared channel (PDSCH) receptions on respective two cells according to embodiments of the present disclosure.

FIG. 10 illustrates an example method for a UE determining a size of a DCI format 1_3 that schedules two PDSCH receptions on respective two cells according to embodiments of the present disclosure. For example, the steps of the method 1000 can be performed by any of the UEs 111-116 of FIG. 1, such as the UE 116 of FIG. 3. The method 1000 of FIG. 10 is for illustration only and other embodiments can be used without departing from the scope of the present disclosure.

As illustrated in FIG. 10, the method 1000 describes a UE (such as the UE 116) receiving a configuration for a scheduling cell and for a set of scheduled cells (step 1010). In step 1020, the UE receives a configuration for a search space set to monitor PDCCH wherein the search space set configuration includes a DCI format 1_3 and wherein DCI format 1_3 schedules two PDSCH receptions on two respective cells from the set of scheduled cells In step 1030, for each cell from the set of scheduled cells, the UE receives a configuration for a size of each field from a first subset of fields, wherein the first subset of fields is from a predetermined set of fields in DCI format 1_3 that are associated with scheduling a PDSCH reception on the cell from the set of scheduled cells. A field from the first subset of fields is included twice in DCI format 1_3, wherein a first occasion is associated with scheduling a first PDSCH reception on a first cell from the set of scheduled cells and a second occasion is associated with scheduling a second PDSCH reception on a second cell from the set of scheduled cells.

In step 1040, the UE also receives a configuration for a size of each field from a second subset of fields from the predetermined set of fields, wherein the second subset of fields is commonly used for scheduling first and second PDSCH receptions on respective first and second cells from the set of scheduled cells.

In certain embodiments, the fields in DCI format 1_3 can be arranged in ascending order of an index of a scheduled cell where the DCI format scheduled a corresponding PDSCH reception. For example, if DCI format includes fields $\{f_0, f_1, \ldots f_M\}$, then DCI format 1_3 can include two blocks of such fields. In this example, a first block for a scheduled cell with a smaller index followed by a second block for a scheduled cell with a larger cell index. Alternatively, fields can be interleaved between scheduled cells in an ascending order of the cell index and DCI format 1_3 can first include two fields $f_0$, followed by two fields $f_1$, and so on up to two fields $f_M$. A same arrangement can apply for the fields of DCI format 0_3.

In certain embodiments, if the scheduled cells where DCI format 1_3 can schedule PDSCH receptions are not predetermined, such as for example a scheduling cell and a predetermined scheduled cell, DCI format 1_3 needs to include a field that indicates a pair scheduled cells. When a UE can be scheduled PDSCH receptions on any pair from $N_{cells}^{DL,2}$ scheduled cells, a number of $[\log_2(N_{cells}^{DL,2} \cdot (N_{cells}^{DL,2}-1)/2)]$ bits in DCI format 1_3 can indicate the pair of scheduled cells. Therefore, instead of a per-cell carrier indicator field, DCI format 1_3 can include dual-carrier indicator field of $[\log_2(N_{cells}^{DL,2} \cdot (N_{cells}^{DL,2}-1)/2)]$ bits. The dual-carrier indicator field can be located first in DCI format 1_3 (possibly only after an "identifier for DCI formats" field of predetermined size) in order for a UE to unambiguously determine the location of the field in DCI format 1_3. It is also possible for DCI format 1_3 to include a bitmap to indicate two scheduled cells from the $N_{cells}^{DL,2}$ cells. The above can be directly generalized to a maximum of $M_{cells}^{max\_sched} > 2$ scheduled cells.

In the following example, reference is made to fields of a DCI format 1_2 as described in Table 1, above. A size of a DL BWP indicator field can be separately configured for each scheduled cell from the $N_{cells}^{DL,2}$ cells. For example, a DL BWP indicator field can have a size of 2 bits for a first scheduled cell and can have a size of 0 bits for a second scheduled cell. Alternatively, when both scheduled cells have a non-zero size for the DL BWP indicator field, DCI format 1_3 can include a single field with a value that applies to both scheduled cells. For example, if a first scheduled cell has 4 configured DL BWP, a second scheduled cell has 2 configured BWPs, and a DL BWP indicator field includes 2 bits, the value of the DL BWP indicator field indicates one of the four DL BWPs for the first scheduled cell and the value of the DL BWP indicator field modulo 2 indicates one of the two DL BWPs for the second scheduled cell. For example, linking DL BWPs for PDSCH receptions on scheduled cells can applicable because either large or small amounts TBs are typically scheduled on both cells. Therefore, when a BWP change is needed, corresponding reasons do not depend on a particular cell and are applicable for all cells.

A size of a time-domain resource allocation (TDRA) field, a PRB bundling size indicator field, a rate matching indicator field, a ZP CSI-RS trigger field, a VRB-to-PRB mapping field, an antenna ports field, an SRS request field, a DMRS sequence initialization field, a transmission configuration indication field, a CBGTI field, or a CBGFI field, can be separately configured for each scheduled cell from the $N_{cells}^{DL,2}$ cells.

A size of a counter DAI field, a total DAI field, a TPC command field, a PUCCH resource indicator field, or a PDSCH-to-HARQ-ACK timing field can be separately configured for each scheduled cell from the $N_{cells}^{DL,2}$ cells or can be same for at least some cells from the $N_{cells}^{DL,2}$ cells. In the latter case, the corresponding fields can be common for the scheduled cells and a corresponding configuration can be common for all scheduled cells.

A size of a modulation and coding scheme (MCS) field can be either separately configured for each scheduled cell or set to 5 bits. When the MCS field is separately configured for each scheduled cell, in order to reduce an increase in a payload of DCI format 1_3 relative to a payload of a DCI format scheduling a PDSCH reception on a single cell, the MCS field value for the second scheduled cell can indicate a differential value of the MCS field value for the first scheduled cell. For example, when a first MCS field for a first scheduled cell has 5 bits indicating one of 32 entries from an MCS table, a second MCS field for a second scheduled cell can be configured to have B<5 bits, wherein first $2^{B-1}$ values indicate an offset to a lower MCS value (negative offset) than the MCS value indicated by the first MCS field, a $2^{B-1}+1$ value indicates a same MCS value as indicated by the first MCS field (zero offset), and last $2^{B-1}-1$ values indicate an offset to a larger MCS value (positive offset) than the MCS value indicated by the first MCS field. Therefore, when B=0 for a scheduled cell, a MCS for PDSCH reception on the scheduled is determined from the MCS field value for the first scheduled cell and, when B=0 for all scheduled cells, the MCS field value is common for all scheduled cells.

A size of a RV field or of a HARQ process number field can be separately configured for each scheduled cell from the $N_{cells}^{DL,2}$ cells. A size of NDI field can be either separately configured for each scheduled cell or set to 1 bit. If a PDSCH transmission on a scheduled cell is configured to be with 2 TBs, the RV field, the HARQ process number field, and the NDI field are repeated for the second TB with a same number of bits as for the first TB.

In certain embodiments, it is possible that DCI format 1_3 is used to schedule only initial TB transmissions (a DCI format scheduling a single PDSCH reception can be used for TB retransmissions) and then the NDI and RV fields can have 0 bits (that is, be absent) in DCI format 1_3. To further reduce an increase in a DCI format 1_3 payload, compared to a payload of a DCI format scheduling a PDSCH reception on a single cell, a use of DCI format 1_3 can be restricted for scheduling PDSCH receptions for a same HARQ process on both cells and then DCI format 1_3 can include only one HARQ process number field.

A size of a FDRA field can be separately configured for each scheduled cell from the $N_{cells}^{DL,2}$ cells since an active DL BWP size can be different among scheduled cells. CA operation targets large data rates and therefore a bandwidth for a corresponding PDSCH reception on a scheduled cell is typically large. As the FDRA field usually requires the largest number of bits among all fields in a DCI format scheduling a PDSCH reception, it is beneficial to determine a number of bits for the FDRA field in DCI format 1_3 using a larger RB group (RBG) size than for determining a number of bits for the FDRA field in a DCI format scheduling a single PDSCH reception on one scheduled cell. For example, for an active DL BWP of 96 RBs, an RBG size can be 8 RBs for a DCI format scheduling a single PDSCH reception on a corresponding cell and therefore an FDRA field for a bitmap of RBGs includes 12 bits, while for a DCI format 1_3 an RBG size can be 16 RBs and therefore an FDRA field for a bitmap of RBGs includes 6 bits.

In certain embodiments, the RBG size is predetermined per range of DL BWP sizes. For example, the RBG size can be 8 RBs for a DL BWP size between 50 RB and 100 RBs, or the RBG size for an active DL BWP can be provided to a UE by UE-specific RRC signaling either separately per DCI format (at least for DCI formats scheduling on PDSCH reception or two PDSCH receptions) or jointly for all DCI formats. In the latter case, an RBG size for interpreting the FDRA field can be derived separately for DCI format 1_3 by scaling an indicated RBG size either by a predetermined factor, such as 2, or be a factor provided to the UE by UE-specific RRC signaling. The size (number of RBs) of RBGs indicated by the FDRA field in the DCI format can be for a reference cell such as the cell of the PDSCH reception that provides the DCI format.

Figure 11:
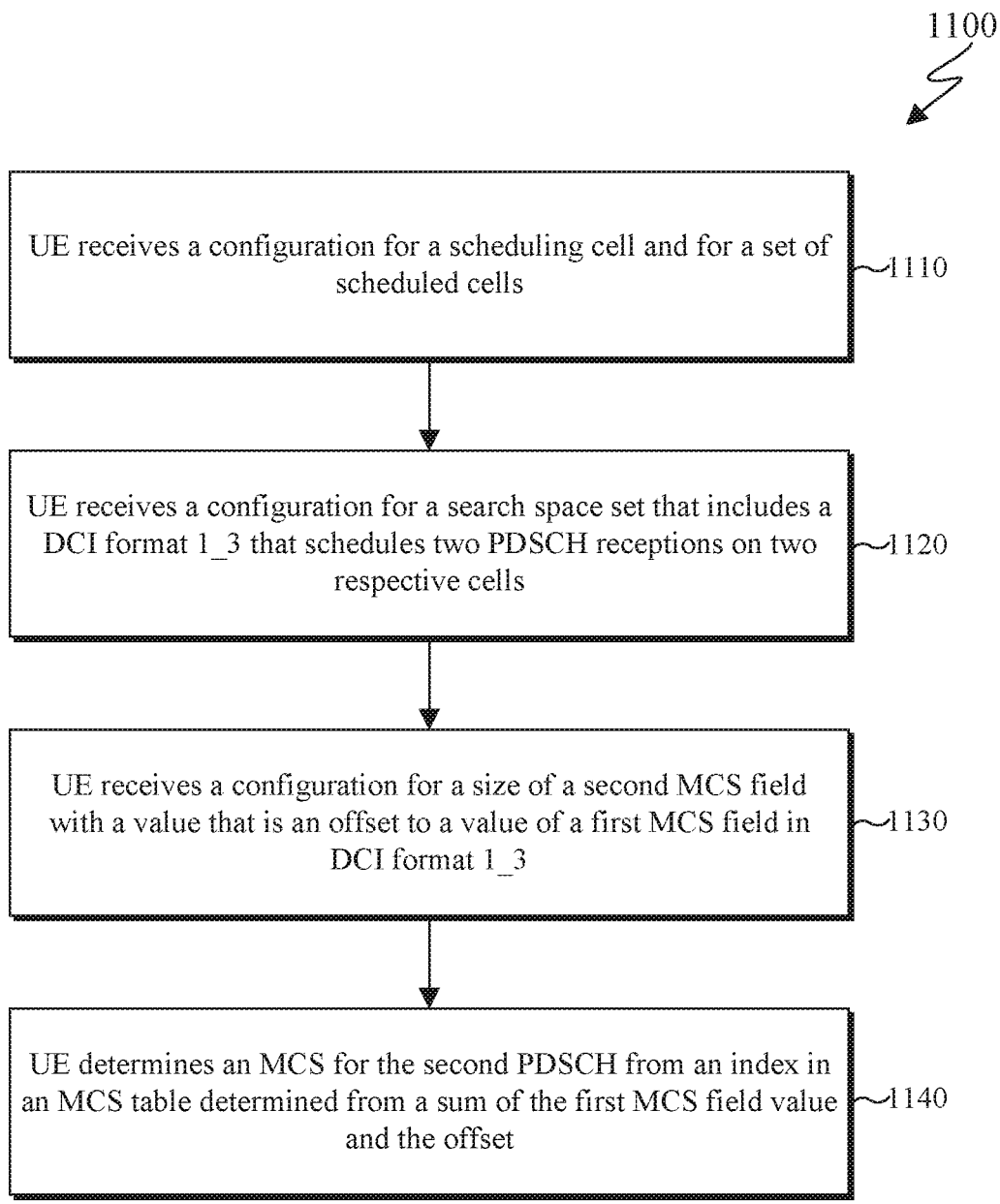
FIG. 11 illustrates an example method for a UE determining Modulation and coding scheme (MCS) for a second PDSCH reception scheduled by a DCI format that schedules two PDSCH receptions on respective two cells according to embodiments of the present disclosure.

FIG. 11 illustrates an example method 1100 for a UE determining MCS for a second PDSCH reception scheduled by a DCI format 1_3 that schedules two PDSCH receptions on respective two cells according to embodiments of the present disclosure. For example, the steps of the method 1100 can be performed by any of the UEs 111-116 of FIG. 1, such as the UE 116 of FIG. 3. The method 1100 of FIG. 11 is for illustration only and other embodiments can be used without departing from the scope of the present disclosure.

As illustrated in FIG. 11, step 1110, describes a UE receiving a configuration for a scheduling cell and for a set of scheduled cells. In step 1120, the UE receives a configuration for a search space set to monitor PDCCH. The search space set configuration includes a DCI format 1_3 that schedules two PDSCH receptions on two respective cells from the set of scheduled cells.

In step 1130, the UE receives a configuration for a size of a second MCS field in DCI format 1_3 wherein a value of the second MCS field is an offset to a value of a first MCS field in DCI format 1_3. In step 1140, the UE determines an MCS for the second PDSCH reception from an index in an MCS table wherein the index is determined from the sum of the value of the first MCS field and the offset.

Figure 12:
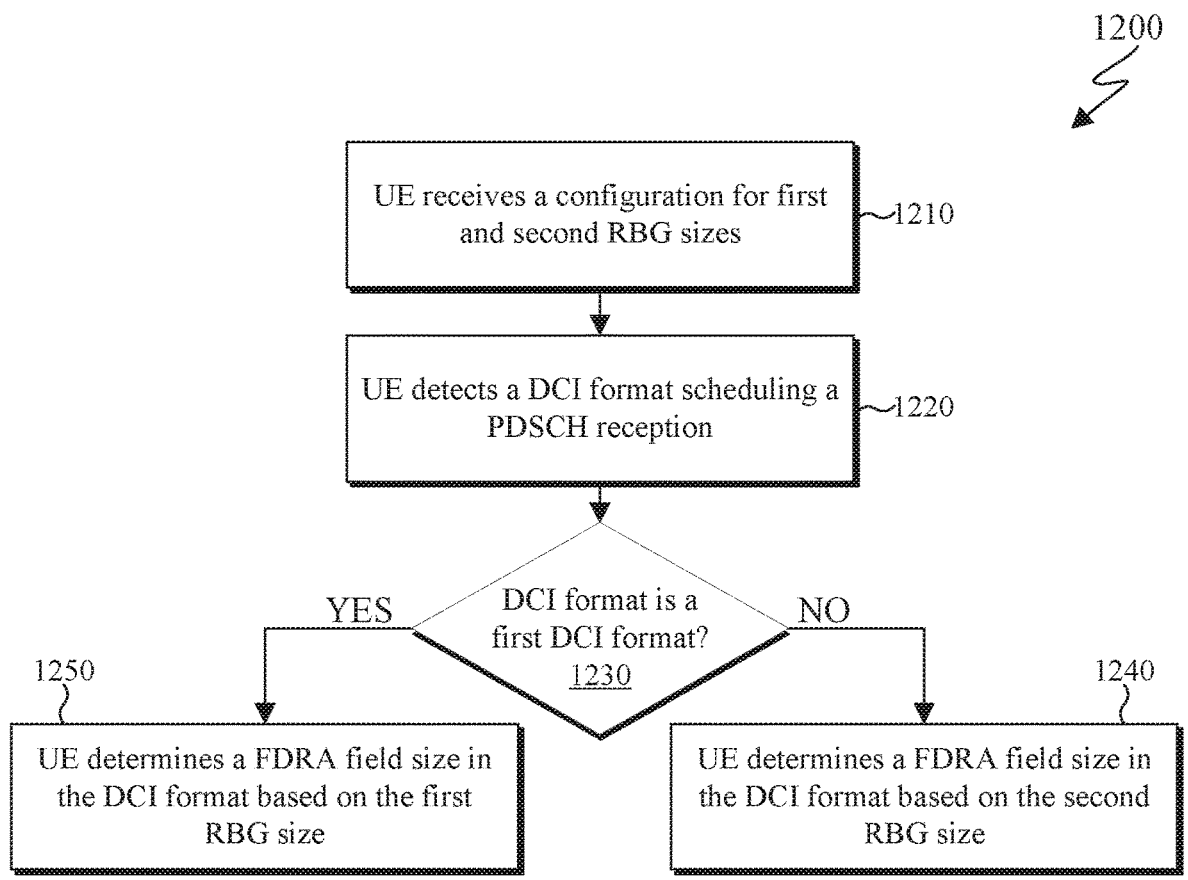
FIG. 12 illustrates an example method for a UE determining a frequency domain resource allocation for a PDSCH reception depending on the DCI format that schedules the PDSCH reception according to embodiments of the present disclosure.

FIG. 12 illustrates an example method 1200 for a UE determining a frequency domain resource allocation for a PDSCH reception depending on the DCI format that schedules the PDSCH reception according to embodiments of the present disclosure. For example, the steps of the method 1200 can be performed by any of the UEs 111-116 of FIG. 1, such as the UE 116 of FIG. 3. The method 1200 of FIG. 12 is for illustration only and other embodiments can be used without departing from the scope of the present disclosure.

As illustrated in FIG. 12, step 1210, describes a UE receiving (or determining) a configuration for a first RBG size and for a second RBG size. In step 1220, the UE detects a DCI format scheduling a PDSCH reception.

In step 1230, the UE determines whether the DCI format is a first DCI format (or a whether the DCI format is a second DCI format). In response to determining that the DCI format is a second DCI format, the UE, in step 1240 determines a FDRA field size in the DCI format based on the second RBG size. Alternatively, in response to determining that the DCI format is a first DCI format, the UE, in step 1250 determines a FDRA field size in the DCI format based on the first RBG size.

For determining a location in a HARQ-ACK codebook of HARQ-ACK information bits in response to decoding of TBs provided in two PDSCH receptions scheduled on two respective cells by a DCI format 1_3 that a UE detects in a PDCCH monitoring occasion m, a value of a counter DAI (C-DAI) field, $V_{C-DAI,c,m}^{DL}$, in the DCI format 1_3 is incremented by 2, instead of being incremented by 1 as in case of a DCI format scheduling a single PDSCH reception. Then, for the PDSCH reception on cells with indexes c and with $c_1$ with $c<c_1$, a location in the HARQ-ACK codebook of corresponding HARQ-ACK information bits for PDSCH reception on cell c can be based on a C-DAI value of $V_{C-DAI,c,m}^{DL}-1$ and cell indexes $\{c+1, \ldots c_1\}$ can be cyclically shifted in order to place HARQ-ACK information for the cell with index $c_1$ after HARQ-ACK information for the cell with index c. This is described in Syntax (1) below. In syntax (1), $T_D=2^{N_{C-DAI}^{DL}}$ and $N_{C-DAI}^{DL}$ is a number of bits for the C-DAI field.

Syntax (1)

if the PDSCH on cell c is scheduled by a DCI format that also schedules a PDSCH reception on cell $c_1$ with $c_1>c$ if $V_{C-DAI,c,m}^{DL}=1$ $V_{C-DDAI,c,m}^{DL}=2 \cdot T_D$;

else $V_{C-DAI,c,m}^{DL}=V_{C-DAI,c,m}^{DL}-1$;

end if
    temp=$c_1$;
    k=1;

while $k<c_1-c$ serving cell index c+k+1=c+k;

k=k+1;

end while
    serving cell index c+1=temp;
end if

In certain embodiments, a size of a counter DAI field (or of a total DAI field) in DCI format 1_3 can be larger, for example by 1 bit in case of two scheduled cells, than a size of a counter DAI field in a DCI format scheduling a single PDSCH reception. A reason is to provide a same level of protection against missed detections for DCI format 1_3 since a counter DAI value in DCI format 1_3 is incremented by 2, instead of 1, in case of two scheduled cells. In general, for a configurable number of bits for a counter DCI field in a DCI format that can schedule PDSCH receptions on more than one cells, a maximum number of bits can be larger than a maximum number of bits for the counter DAI field in a DCI format that schedules a PDSCH reception on only one cell. A same approach can apply for a total DAI field.

Figure 13:
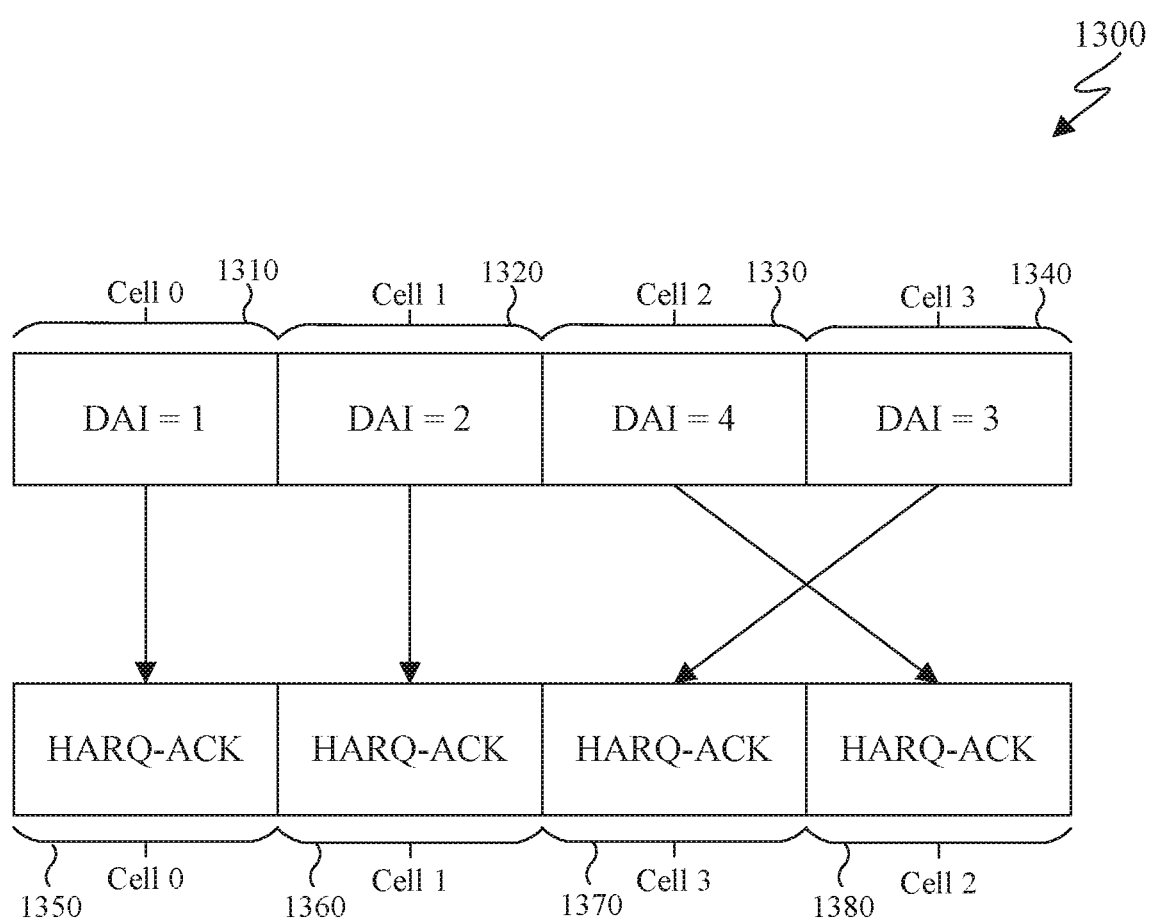
FIG. 13 illustrates a diagram of a UE processing a downlink assignment index (DAI) value in a DCI format scheduling two PDSCH receptions on two respective cells and in another DCI format scheduling a PDSCH reception on one cell according to embodiments of the present disclosure.

FIG. 13 illustrates a diagram 1300 of a UE processing a DAI value in a DCI format scheduling two PDSCH receptions on two respective cells and in another DCI format 1_3 scheduling a PDSCH reception on one cell according to embodiments of the present disclosure.

As described in the diagram 1300, in a PDCCH monitoring occasion, a UE (such as the UE 116) detects a first DCI format that schedules a PDSCH reception on cell 0 and includes a counter DAI field with value 1 1310. The UE also detects a DCI format 1_3 that schedules a PDSCH reception on cell 1 1320 and a PDSCH reception on cell 3 1330 and includes a counter DAI field with value 3. The UE also detects a DCI format that schedules a PDSCH reception on cell 3 1340. For reporting HARQ-ACK information in a HARQ-ACK codebook, the UE places first HARQ-ACK information in response to PDSCH reception on cell 0 1350, following by HARQ-ACK information in response to PDSCH reception on cell 1 1360, HARQ-ACK information in response to PDSCH reception on cell 3 1370, and HARQ-ACK information in response to PDSCH reception on cell 2 1380. Serving cell indexes are rearranged for placing corresponding HARQ-ACK information in a HARQ-ACK codebook.

In certain embodiments, DCI format 1_3 is also used for scheduling a single PDSCH. This can be achieved by including a 1-bit field in DCI format 1_3 indicating scheduling of one PDSCH reception, for example with a value of '0', or scheduling of two PDSCH receptions, for example with a value of '1'. In case of one PDSCH reception, a UE can ignore the fields associated with the second PDSCH reception. Alternatively, the UE can reinterpret the bits of the fields associated with the second PDSCH reception, at least the ones that are separate from the fields associated with the first PDSCH reception, to be part of the bits of the corresponding fields associated with the first PDSCH reception in order to increase the size of some or all of such fields up to a maximum predetermined size and therefore increase a scheduling configurability/flexibility for the first PDSCH reception.

Although FIGS. 10, 11, and 12 illustrate the methods 1000, 1100, and 1200, various changes may be made to FIGS. 10, 11, and 12. For example, while the method 1000 of FIG. 10, the method 1100 of FIG. 11, and the method 1200 of FIG. 12 are shown as a series of steps, various steps could overlap, occur in parallel, occur in a different order, or occur multiple times. In another example, steps may be omitted or replaced by other steps. For example, steps of the method 1000 can be executed in a different order.

Embodiments of the present disclosure describe a DCI format scheduling multiple PUSCH transmissions from a UE on respective multiple cells. The following examples and embodiments describe designing a DCI format scheduling multiple PUSCH transmissions from a UE on respective multiple cells.

An embodiment of this disclosure also considers a design for a DCI format that schedules multiple PUSCH transmissions from a UE on respective multiple cells. For brevity, such DCI format is referred to as DCI format 0_3 and the exemplary embodiment considers scheduling of two PUSCH transmissions on two respective DL cells.

Since different cells can have different operating characteristics, such as different operating bandwidth or different duplexing method (such as FDD or TDD) and as a UE can experience different channel conditions, such as different signal-to-interference and noise ratios (SINRs), the size of each field in DCI format 0_3 are separately configured for each cell.

For a DCI format 0_3 scheduling PUSCH transmissions on multiple cells, same design principles can apply for all fields that also exist in DCI format 1_3. For example, an MCS field in a DCI format scheduling multiple PUSCH transmissions on respective multiple scheduled cells can be applicable to all the multiple PUSCH transmissions or can be applicable to a PUSCH transmission on a first scheduled cell and additional MCS fields of B bits can be applicable to remaining scheduled cells from the multiple cells. Corresponding descriptions are omitted for brevity and the remaining for the description are for fields that exist in DCI format 0_3 but do not exist in DCI format 1_3.

With reference to fields of DCI format 0_2 in Table 2, above, a size of a SUL indicator field, of a FH flag field, of a TPC command field, of an SRI field, of a precoding information and number of layers field, of antenna port(s) field, of a PTRS-DMRS association field, of a DMRS sequence initialization field, or of an OLPC parameter set indication field, can be separately configured for each scheduled cell from the $N_{cells}^{UL,2}$ cells. In case a TPC command field size associated with scheduling a second PUSCH transmission is not provided, for example for intra-band CA where similar channel fading conditions apply to PUSCH transmissions on both cells, the UE applies a same TPC command provided by the single TPC command field in DCI format 0_3 to determine a power for both the first and second PUSCH transmissions on corresponding first and second cells.

In certain embodiments, a DAI field, a CSI request field, a beta_offset indicator field, or an UL-SCH indicator field can be separately configured for each scheduled cell from the $N_{cells}^{UL,2}$ cells or can be same for at least some cells from the $N_{cells}^{UL,2}$ cells. In the latter case, a UE the fields can be common for the scheduled cells and are not configured per scheduled cell, or can be configured only for a first cell. The applicability of the DAI, CSI request, beta_offset indicator, or UL-SCH indicator field can be for only for one PUSCH of the two PUSCHs and the one PUSCH can be same for all those fields. The one PUSCH can be the PUSCH transmitted on a cell with a smallest index or a largest index between the two cells, or the PUSCH transmitted on the scheduling cell, if any, or otherwise on the cell determined either explicitly, based on an additional 1-bit field in DCI format 0_3, or implicitly such as for example based on a number of available resources for UCI multiplexing or a MCS of a PUSCH transmission and then the UE selects the PUSCH providing a larger corresponding value.

A UE can expect that a size of DCI format 0_3 is same as a size of DCI format 1_3 if, otherwise, a number of sizes of DCI formats with CRC scrambled by a C-RNTI that a UE is configured to monitor would be larger than 3.

Figure 14:
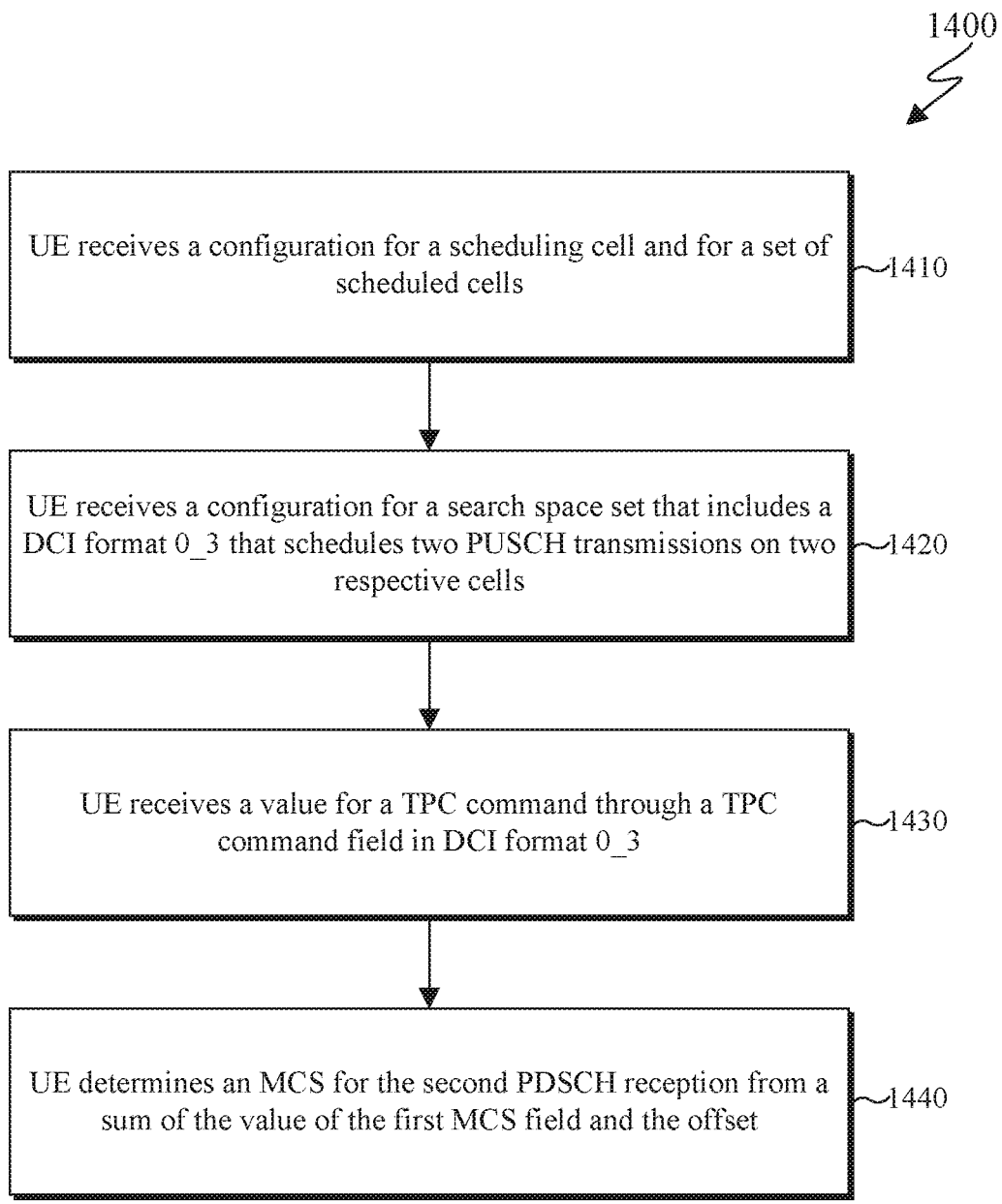
FIG. 14 illustrates an example method for a UE determining first and second powers for respective first and second physical uplink shared channel (PUSCH) transmissions scheduled by a DCI format on respective first and second cells according to embodiments of the present disclosure.
Figure 15:
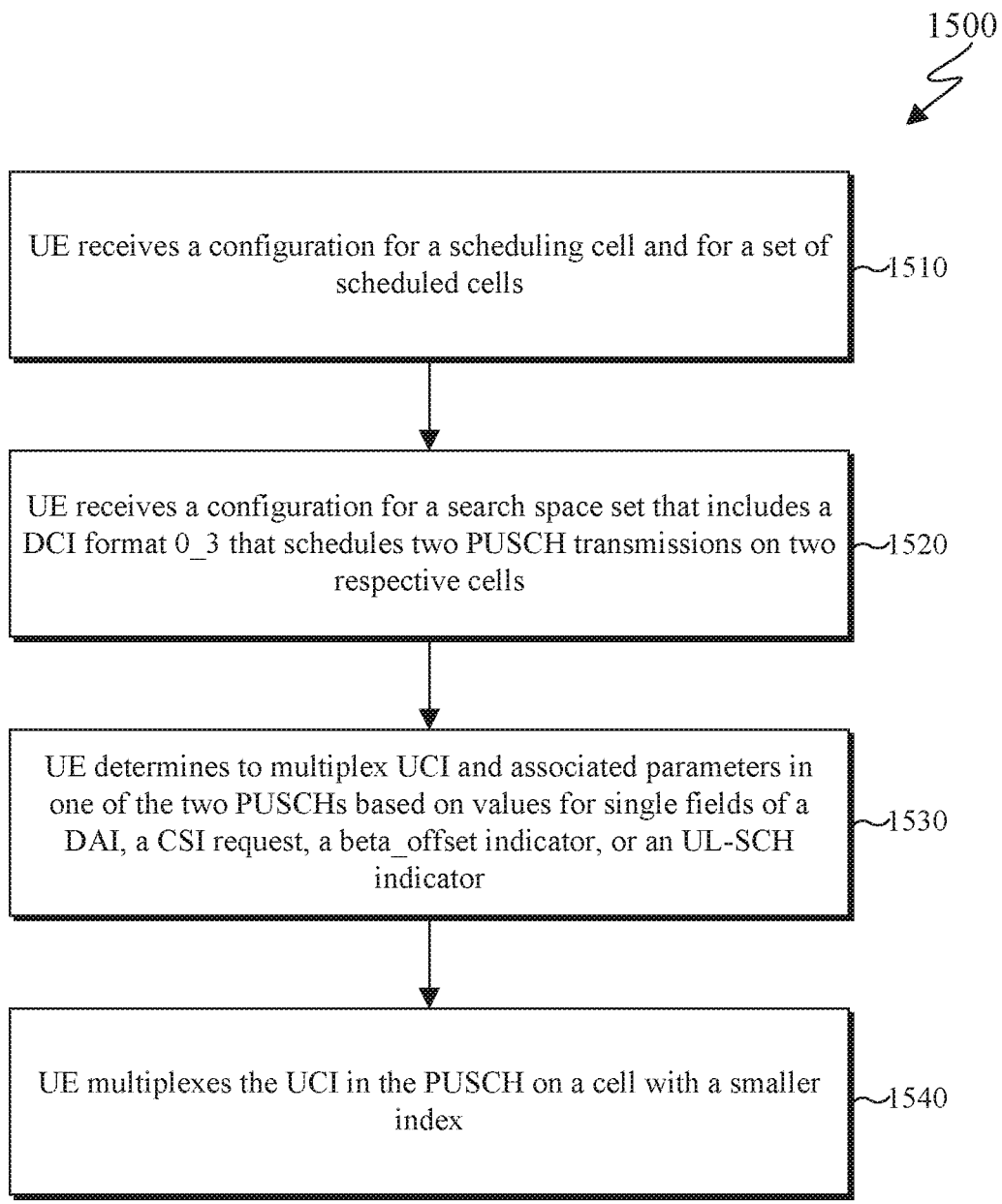
FIG. 15 illustrates an example method for a UE multiplexing UCI in a PUSCH transmission in response to a detection of a DCI format scheduling two PUSCH transmissions on two respective cells according to embodiments of the present disclosure.

FIG. 14 illustrates an example method 1400 for a UE determining first and second powers for respective first and second PUSCH transmissions scheduled by a DCI format on respective first and second cells according to embodiments of the present disclosure. FIG. 15 illustrates an example method 1500 for a UE multiplexing UCI in a PUSCH transmission in response to a detection of a DCI format scheduling two PUSCH transmissions on two respective cells according to embodiments of the present disclosure. For example, the steps of the method 1400 and the method 1500 can be performed by any of the UEs 111-116 of FIG. 1, such as the UE 116 of FIG. 3. The method 1400 of FIG. 14 and the method 1500 of FIG. 15 are for illustration only and other embodiments can be used without departing from the scope of the present disclosure.

As illustrated in FIG. 14, step 1410, describes a UE receiving a configuration for a scheduling cell and for a set of scheduled cells. In step 1420, the UE receives a configuration for a search space set to monitor PDCCH wherein the search space set configuration includes a DCI format 0_3. The DCI format 0_3 schedules two PUSCH transmissions on two respective cells from the set of scheduled cells. In step 1430, the UE receives a value for a TPC command through a TPC command field in DCI format 0_3. In step 1440, the UE determines both a first power for a first PUSCH transmission on a first cell and a second power for a second PUSCH transmission on a second cell based on the value of the TPC command.

As illustrated in FIG. 15, step 1510, describes a UE receiving a configuration for a scheduling cell and for a set of scheduled cells. In step 1520, the UE receives a configuration for a search space set to monitor PDCCH wherein the search space set configuration includes a DCI format 0_3 and wherein DCI format 0_3 schedules two PUSCH transmissions on two respective cells from the set of scheduled cells.

In step 1530, the UE determines to multiplex UCI (such as HARQ-ACK information or a CSI report) and associated parameters for UCI multiplexing in one of the two PUSCH transmissions based on information provided by values for one or more single fields of a DAI, a CSI request, a beta_offset indicator, or an UL-SCH indicator in the DCI format 0_3.

In step 1540, the UE multiplexes the UCI in the PUSCH transmission on a cell with a smaller index or in the PUSCH transmission indicated by an additional binary field in DCI format 0_3.

Although FIGS. 14, and 15 illustrate the methods 1400, and 1500, various changes may be made to FIGS. 14, and 15. For example, while the method 1400 of FIG. 14 and the method 1500 of FIG. 15 are shown as a series of steps, various steps could overlap, occur in parallel, occur in a different order, or occur multiple times. In another example, steps may be omitted or replaced by other steps. For example, steps of the method 1400 can be executed in a different order.

Embodiments of the present disclosure describe PDCCH monitoring capability for cells. The following examples and embodiments describe where a UE is scheduled by a DCI format 0_3 or by a DCI format 1_3.

An embodiment of this disclosure also considers a determination for a total number of PDCCH candidates and a total number of non-overlapped CCEs when a UE is configured to monitor PDCCH for detection of only DCI format 0_3 or only DCI format 13 for scheduling on a subset of scheduled cells from a set of scheduled cells.

In certain embodiments, a partitioning of a PDCCH monitoring capability for a UE between cells where the UE is configured at least one search space set for monitoring PDCCH to detect a DCI format scheduling a single PDSCH reception or a single PUSCH transmission and cells where the UE is configured only search space sets for monitoring PDCCH to detect a DCI format 0_3 or a DCI format 1_3 is subsequently considered. The exemplary embodiment considers two cells but a same determination applies when a DCI format 0_3 or a DCI format 1_3 can schedule a maximum of $M_{cells}^{max\_sched}$ scheduled cells.

For example, a UE (such as the UE 116) can configure a first set of $N_{cells}^{DL,1,\mu}$ serving cells. In this example, the UE (i) is either not provided CORESETPoolIndex or is provided CORESETPoolIndex with a single value for all CORESETs on all DL BWPs of each cell from the first set of cells $N_{cells,0}^{DL,1,\mu}$, and (ii) at least one search space set is for monitoring PDCCH to detect a DCI format scheduling a single PDSCH reception or a single PUSCH transmission for each cell from the first set of $N_{cells,0}^{DL,1,\mu}$. The UE can also configure a second set of $N_{cells,0}^{DL,2,\mu}$ serving cells. Here, the UE (i) is either not provided CORESETPoolIndex or is provided CORESETPoolIndex with a single value for all CORESETs on all DL BWPs of each cell from the first set of cells $N_{cells,0}^{DL,2,\mu}$, and (ii) all search space sets are for monitoring PDCCH to detect only DCI formats scheduling two PDSCH receptions or two PUSCH transmissions on two respective cells from the second set of $N_{cells,0}^{DL,2,\mu}$. The UE can also configure a third set of $N_{cells,1}^{DL,1,\mu}$ serving cells. Here, the UE (i) is provided CORESETPoolIndex with a value 0 for a first CORESET and with a value 1 for a second CORESET on any DL BWP of each cell from the second set of $N_{cells,1}^{DL,1,\mu}$ cells, and (ii) at least one search space set is for monitoring PDCCH to detect a DCI format scheduling a single PDSCH reception or a single PUSCH transmission for each cell from the first set of $N_{cells,1}^{DL,1,\mu}$. The UE can also configure another set of $N_{cells,0}^{DL,2,\mu}$ serving cells. Here, the UE (i) is provided CORESETPoolIndex with a value 0 for a first CORESET and with a value 1 for a second CORESET on any DL BWP of each cell from the second set of $N_{cells,1}^{DL,1,\mu}$ cells, and (ii) all search space sets are for monitoring PDCCH to detect only DCI formats scheduling two PDSCH receptions or two PUSCH transmissions on two respective cells from the second set of $N_{cells,1}^{DL,2,\mu}$. In these examples $N_{cells,0}^{DL,1,\mu} + N_{cells,0}^{DL,2,\mu} = N_{cells,0}^{DL,\mu}$ and $N_{cells,1}^{DL,1,\mu} + N_{cells,1}^{DL,2,\mu} = N_{cells,1}^{DL,\mu}$, the UE is not required to monitor more than the expressions described in Equation (2) or Equation (3). In particular, Equation (2) is for PDCCH candidates while Equation (3) is for non-overlapped CCEs per slot on the active DL BWP(s) of scheduling cell(s) from the $N_{cells,0}^{DL,\mu} + N_{cells,1}^{DL,\mu}$ downlink cells.

$$M_{PDCCH}^{total,slot,\mu} = \left\lfloor N_{cells}^{cap} \cdot M_{PDCCH}^{max,slot,\mu} \cdot \left(N_{cells,0}^{DL,1,\mu} + \lceil N_{cells,0}^{DL,2,\mu}/2\rceil + \gamma \cdot \left(N_{cells,1}^{DL,1,\mu} + \lceil N_{cells,1}^{DL,2,\mu}/2\rceil\right)\right) \middle/ \sum_{j=0}^{3}\left(N_{cells,0}^{DL,1,j} + \lceil N_{cells,0}^{DL,2,j}/2\rceil + \gamma \cdot \left(N_{cells,1}^{DL,1,j} + \lceil N_{cells,1}^{DL,2,j}/2\rceil\right)\right)\right\rfloor \quad (2)$$

$$C_{PDCCH}^{total,slot,\mu} = \left\lfloor N_{cells}^{cap} \cdot C_{PDCCH}^{max,slot,\mu} \cdot \left(N_{cells,0}^{DL,1,\mu} + \lceil N_{cells,0}^{DL,2,\mu}/2\rceil + \gamma \cdot \left(N_{cells,1}^{DL,1,\mu} + \lceil N_{cells,1}^{DL,2,\mu}/2\rceil\right)\right) \middle/ \sum_{j=0}^{3}\left(N_{cells,0}^{DL,1,j} + \lceil N_{cells,0}^{DL,2,j}/2\rceil + \gamma \cdot \left(N_{cells,1}^{DL,1,j} + \lceil N_{cells,1}^{DL,2,j}/2\rceil\right)\right)\right\rfloor \quad (3)$$

In the above expressions of Equations (2) and (3) for $M_{PDCCH}^{total,slot,\mu}$ and $C_{PDCCH}^{total,slot,\mu}$, it is also possible to consider a possibly slightly larger value for $M_{PDCCH}^{total,slot,\mu}$ and $C_{PDCCH}^{total,slot,\mu}$ from having $N_{cells,0}^{DL,2,\mu}$ cells and the $N_{cells,0}^{DL,2,\mu}$ cells and determine Equation (4) or Equation (5). In particular, Equation (4) is for PDCCH candidates while Equation (5) is for non-overlapped CCEs per slot on the active DL BWP(s) of scheduling cell(s) from the $N_{cells,0}^{DL,\mu} + N_{cells,1}^{DL,\mu}$ downlink cells.

$$M_{PDCCH}^{total,slot,\mu} = \left\lfloor N_{cells}^{cap} \cdot M_{PDCCH}^{max,slot,\mu} \cdot \left(N_{cells,0}^{DL,1,\mu} + \lfloor N_{cells,0}^{DL,2,\mu}/2\rfloor + \gamma \cdot \left(N_{cells,1}^{DL,1,\mu} + \lfloor N_{cells,1}^{DL,2,\mu}/2\rfloor\right)\right) \middle/ \sum_{j=0}^{3}\left(N_{cells,0}^{DL,1,j} + \lfloor N_{cells,0}^{DL,2,j}/2\rfloor + \gamma \cdot \left(N_{cells,1}^{DL,1,j} + \lfloor N_{cells,1}^{DL,2,j}/2\rfloor\right)\right)\right\rfloor \quad (4)$$

$$C_{PDCCH}^{total,slot,\mu} = \left\lfloor N_{cells}^{cap} \cdot C_{PDCCH}^{max,slot,\mu} \cdot \left(N_{cells,0}^{DL,1,\mu} + \lfloor N_{cells,0}^{DL,2,\mu}/2\rfloor + \gamma \cdot \left(N_{cells,1}^{DL,1,\mu} + \lfloor N_{cells,1}^{DL,2,\mu}/2\rfloor\right)\right) \middle/ \sum_{j=0}^{3}\left(N_{cells,0}^{DL,1,j} + \lfloor N_{cells,0}^{DL,2,j}/2\rfloor + \gamma \cdot \left(N_{cells,1}^{DL,1,j} + \lfloor N_{cells,1}^{DL,2,j}/2\rfloor\right)\right)\right\rfloor \quad (5)$$

In certain embodiments, a UE evaluates, per slot, whether a number of configured PDCCH candidates, according to corresponding configured search space sets, exceeds a limit for non-overlapping CCE or a limit for a number of PDCCH candidates, also referred to as blind decoding (BD) limit, that the UE is expected to be able to monitor in a slot. When the UE is configured to monitor PDCCH according to a combination (X, Y), where X is a number of symbols between first symbols in successive PDCCH monitoring occasions that are separated by more than Y symbols defining a span, the UE can perform the previous evaluation only for the first span of each slot. As described in Syntax (2), below, the UE drops PDCCH monitoring for all search space sets with indexes larger than or equal to the index of a search space set where the UE reaches the limit for the number of non-overlapped CCEs or the limit for the number of PDCCH candidates that the UE can monitor in a slot (or the first span of a slot).

Syntax (2)

Denote by $V_{CCE}(s_{uss}(j))$ the set of non-overlapping CCEs for search space set $s_{uss}(j)$ and by $c(V_{CCE}(s_{uss}(j)))$ the cardinality of $V_{CCE}(s_{uss}(j))$ where the non-overlapping CCEs for search space set $s_{uss}(j)$ are determined considering the allocated PDCCH candidates for monitoring for the CSS sets and the allocated PDCCH candidates for monitoring for all search space sets $s_{uss}(k)$, $0 \leq k \leq j$.

Set $M_{PDCCH}^{uss} = \min(M_{PDCCH}^{max,slot,\mu}, M_{PDCCH}^{total,slot,\mu}) - M_{PDCCH}^{css}$ Set $C_{PDCCH}^{uss} = \min(C_{PDCCH}^{max,slot,\mu}, C_{PDCCH}^{total,slot,\mu}) css$ Set $j=0$ while $\sum_L M_{s_{uss}(j)}^{(L)} \leq M_{PDCCH}^{uss}$ AND $c(V_{CCE}(S_{uss}(j))) \leq C_{PDCCH}^{uss}$ allocate $\sum_L M_{s_{uss}(j)}^{(L)}$ PDCCH candidates for monitoring to USS set $S_{uss}(j)$ $M_{PDCCH}^{uss} = M_{PDCCH}^{uss} - \sum_L s_{uss}(j)^{(L)}$;

$j=j+1$;

end while

Accordingly, embodiments of the present disclosure relate to PDCCH allocation or dropping by scaling of PDCCH candidates to monitor for PDCCH blind decoding in a slot or a span. The disclosure additionally relates to search space set switching for PDCCH monitoring requested by UE. This disclosure also relates to PDCCH allocation or dropping based on predetermined CCE AL order for PDCCH blind decoding in a slot or a span.

In certain embodiments, when a UE (such as the UE 116) is configured to monitor in a slot more non-overlapped CCEs or more PDCCH candidates for scheduling on a cell than a corresponding UE PDCCH monitoring capability in the slot for the cell as was previously described, the UE skips PDCCH monitoring for all search space (SS) set(s) with larger than or equal search space set ID than the search space ID where a corresponding limit is reached. As such, PDCCH candidate dropping at a granularity of search spaceset level is coarse and can result to more dropped PDCCH candidates than necessary. For example, when after an allocation of PDCCH candidates and non-overlapping CCEs to search space sets with first indexes, a remaining number of PDCCH candidates is 5 and a number of configured for a search space set with a next index is 6, a UE drops PDCCH monitoring for all remaining PDCCH candidates even though a corresponding capability would be exceeded by only one PDCCH candidate. The inefficient PDCCH dropping rule could cause unnecessary PDCCH blocking due to an unnecessary reduction in PDCCH candidates. The problem can be more severe for mid-tier UEs that typically require reduced cost and consequently have reduced capabilities (RedCap UEs) as the percentage of unnecessarily dropped PDCCH candidates, relative to the total number of PDCCH candidates, can be larger than for UEs with a larger PDCCH monitoring capability.

In addition to unnecessary PDCCH candidate dropping, PDCCH dropping per search space set can degrade a reliability of PDCCH reception when multiple beams are used and PDCCHs can be configured to be received in control resource sets (CORESETs) having a different transmission configuration indicator (TCI) state that corresponding to a different PDCCH transmission beam through corresponding different quasi collocation (QCL) properties. For example, a search space set is associated with a CORESET that has a QCL assumption indicating a directional beam for reception. When PDCCH dropping is per whole search space set, search space sets corresponding to CORESETs with different beam directions or QCL assumptions may be dropped for some beam directions.

When dropping PDCCH candidates to satisfy a UE monitoring capability per slot and per scheduled cell for a corresponding sub-carrier spacing (SCS) configuration for a scheduling cell, it can be beneficial for a UE to drop candidates that are less likely to be used for scheduling PDSCH receptions by or PUSCH transmissions from the UE. For example, as a serving gNB (such as the BS 102) configures a UE (such as the UE 116) with search space sets based on RRC signaling, and RRC re-configurations are infrequent in order to avoid corresponding signaling overhead, a search space set is likely to include PDCCH candidates for channel control element (CCE) aggregation levels ranging from a smallest one, such as 1 CCE, to a largest one such as 16 CCEs to enable scheduling when the UE experiences corresponding favorable or unfavorable channel conditions such as a larger signal-to-interference and noise ratio (SINR) or a low SINR. However, the gNB may use for a PDCCH transmission a corresponding CCE aggregation level reflecting a last reference signal received power (RSRP) report or a last channel state information (CSI) report from the UE for a scheduling cell and then a UE would unnecessarily monitor a number of PDCCH candidates that corresponding to CCE aggregation levels that are unlikely to be used by a serving gNB on the scheduling cell. Accordingly, it would then be beneficial for a UE to monitor PDCCH according to search space sets reflecting channel conditions that the UE is experiencing, such as a SINR, or to avoid monitoring PDCCH candidates for CCE aggregation levels that are unlikely to be used by a serving gNB for PDCCH transmissions to the UE on a scheduling cell to schedule unicast PDSCH receptions by the UE or PUSCH transmissions from the UE.

Therefore, embodiments of the present disclosure take into consideration that there is a need to support a scaling of PDCCH candidates for PDCCH dropping. Embodiments of the present disclosure also take into consideration that there is a need to support UE requested search space set switching. Additionally, embodiments of the present disclosure take into consideration that there is need to support PDCCH dropping based on predetermined CCE AL order.

Accordingly, when the UE is configured to monitor PDCCH according to a combination (X, Y), where X is a number of symbols between first symbols in successive PDCCH monitoring occasions that are separated by more than Y symbols defining a span, where Y is larger than a slot, the UE can evaluate per span only whether a number of configured PDCCH candidates, according to any of approaches defined in this disclosure, exceeds a limit for non-overlapping CCE or a limit for a number of PDCCH candidates only for the span.

Embodiments of the present disclosure describe scaling PDCCH candidates for PDCCH dropping. The following examples and embodiments describe scaling PDCCH candidates for PDCCH dropping.

An embodiment of this disclosure considers a PDCCH candidate allocation procedure, or a PDCCH candidate dropping procedure, by scaling a number of PDCCH candidates that a UE monitors in a slot or in a span.

Let $M_{PDCCH}^{USS}$ and $C_{PDCCH}^{USS}$ be the remaining PDCCH candidates and remaining non-overlapping CCEs for search space sets where a UE (such as the UE 116) monitors PDCCH according to USS, respectively, after the UE performs a corresponding allocation to search space sets where the UE monitors PDCCH according to CSS. The UE determines the initial value as described in Equations (6) and (7), below.

$$M_{PDCCH}^{USS} = \min(M_{PDCCH}^{max,slot,\mu}, M_{PDCCH}^{total,slot,\mu}) - M_{PDCCH}^{CSS} \quad (6)$$

$$C_{PDCCH}^{USS} = \min(C_{PDCCH}^{max,slot,\mu}, C_{PDCCH}^{total,slot,\mu}) - C_{PDCCH}^{CSS} \quad (7)$$

Denote by $V_{CCE}(S_{USS}(j))$ the set of non-overlapping CCEs for search space set $S_{USS}(j)$ and by $C(V_{CCE}(S_{USS}(j)))$ the cardinality of $V_{CCE}(S_{USS}(j))$. $M_{S_{USS}(j)}^{(L)}$ denotes the number of configured PDCCH candidates for search space set $S_{USS}(j)$ at CCE aggregation level (AL) of L CCEs.

In a first approach, a procedure for scaling a number of PDCCH candidates is used. A UE applies a scaling for the number of PDCCH candidates across all configured USS sets. The UE determines the allocated PDCCH candidates for K configured USS set(s) in an accumulate manner based on a PDCCH candidate allocation or dropping rule, as described in Syntax (3), below.

Syntax (3)

set $X = X_{step}$, $j=0$.

while $X \leq 1$ AND $\Sigma_L[X_{step} \cdot M_{S_{USS}(j)}^{(L)}] \leq M_{PDCCH}^{USS}$
AND $[X_{step} \cdot C(V_{CCE}(S_{USS}(j)))] \leq C_{PDCCH}^{USS}$ allocate (additional) $\Sigma_L[X_{step} \cdot M_{USS(j)}^{(L)}]$ PDCCH candidates for
monitoring to USS set $S_{USS}(j)$ $M^{PDCCH}_{USS} = M_{PDCCH}^{USS} - \Sigma_L[X_{step} \cdot M_{S_{USS}(j)}^{(L)}]$;

$C_{PDCCH}^{USS} = C_{PDCCH}^{USS} - [X_{step} \cdot C(V_{CCE}(S_{USS}(j)))]$;

$j = \mod(j+1, K)$

If j=0,
  set X=X+X_{step}
end if;
end while

As described in Syntax (3), X and $X_{step}$ are accumulated scaling factor and scaling for each step, respectively. $X_{step}$ can be provided to UE either by higher layer signalling or predefined in the specification of system operation. For example, $X_{step}$=0.25.

In certain embodiments instead of starting from X0 and increasing the PDCCH candidate allocation fraction by $X_{step}$, the procedure first checks whether any scaling is needed. If the scaling factor is needed the procedure decreases/scales the number of PDCCH candidates across the search space sets for USS by a factor of $X_{step}$, determines whether the decreased/scaled PDCCH candidates can be allocated, and either stops the procedure is the scaled/decreased PDCCH candidates can be allocated or repeats the procedure from the step of scaling (again) the number of PDCCH candidates across the search space sets for USS by a factor of $X_{step}$. the corresponding Syntax (4), below, for the PDCCH allocation as described in Syntax (4) below.

Syntax (4)

set X=1,j=0 while $j \neq K$ AND $X > 0$ set j=0,$M_{PDCCH}^{(X)} = M_{PDCCH}^{USS}, C_{PDCCH}^{(X)}, C_{PDCCH}^{USS}$;

while $\Sigma_L[X \cdot M_{S_{USS}(j)}^{(L)}] \leq M_{PDCCH}^{(X)}$ AND $[X \cdot C(V_{CCE}(S_{USS}(j)))] \leq C_{PDCCH}^{(X)}$ (re)allocate $E_L[X \cdot M_{S_{USS}(j)}^{(L)}]$ PDCCH candidates for monitoring to
    USS set $S_{USS}(j)$ $M_{PDCCH}^{(X)} = M_{PDCCH}^{(X)} - \Sigma_L[X \cdot M_{S_{USS}(j)}^{(L)}]$;

$C_{PDCCH}^{(X)} = C_{PDCCH}^{(X)} - [X \cdot C(V_{CCE}(S_{USS}(j)))]$;

j=j+1
  end while
  set X=X-$X_{step}$
end while

As described in Syntax (4), $X_{step}$ is the updating step for the scaling factor 0<X≤1. $X_{step}$ can be provided to UE either by higher layer signalling or can be predefined in the specification of system operation. For example, $X_{step}$=0.25.

Figure 16:
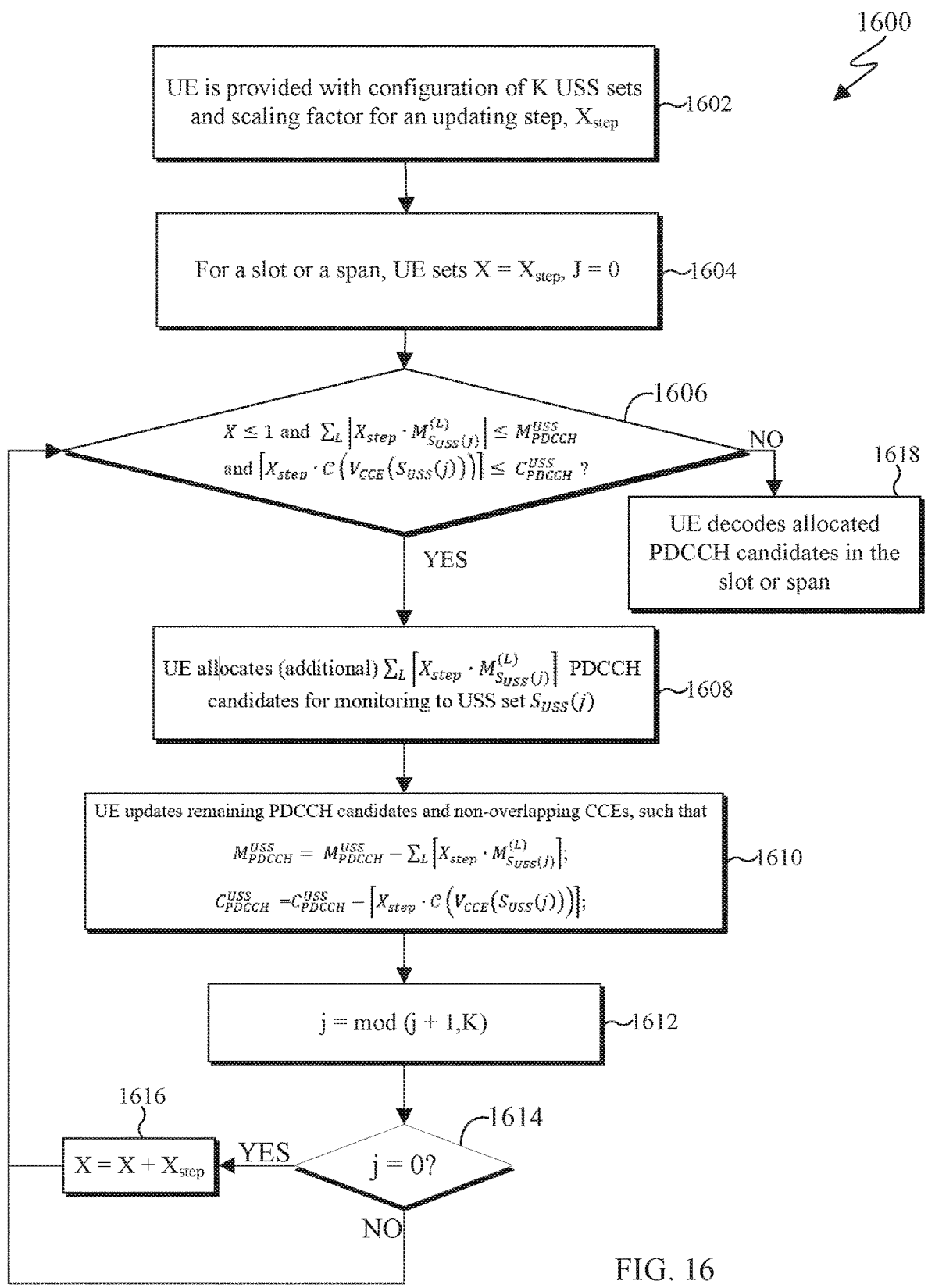
FIGS. 16, 17, and 18 illustrate example methods for a UE determining a number of physical downlink control channel (PDCCH) candidates to monitor in a slot for scheduling on a cell for PDCCH candidate scaling according to embodiments of the present disclosure.
Figure 17:
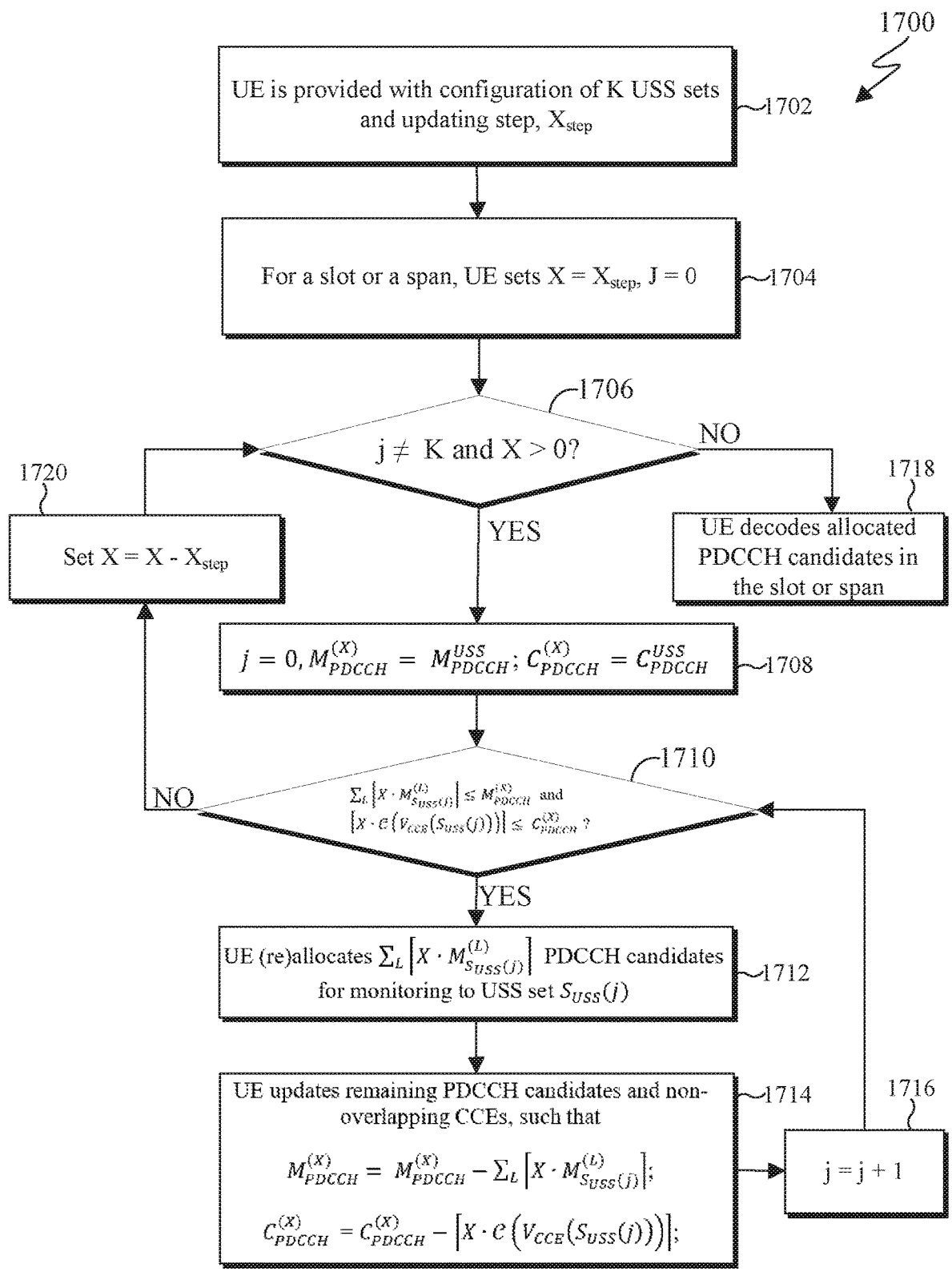
Figure 18:
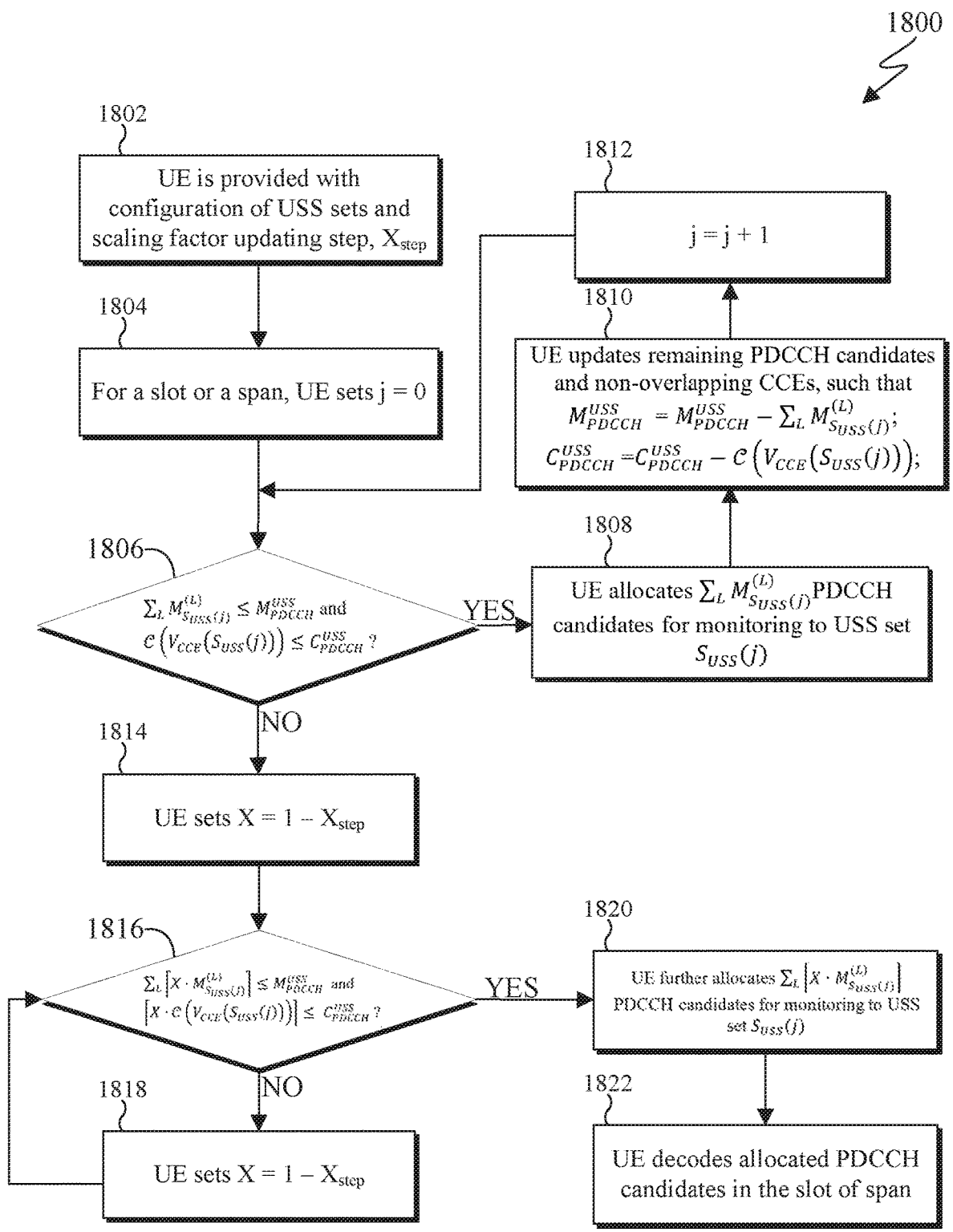

FIGS. 16, 17, and 18 illustrate example methods 1600, 1700 and 1800, respectively, for a UE determining a number of PDCCH candidates to monitor in a slot for scheduling on a cell for PDCCH candidate scaling according to embodiments of the present disclosure. For example, the steps of the method 1500 can be performed by any of the UEs 111-116 of FIG. 1, such as the UE 116 of FIG. 3. The methods 1600, 1700 and 1800, are for illustration only and other embodiments can be used without departing from the scope of the present disclosure.

As illustrated in FIG. 16, step 1602, describes a UE being provided with configuration of K USS sets and scaling factor for an updating step, $X_{step}$. In step 1604, for a slot or a span, the UE sets a value of scaling factor X to $X_{step}$, j=0. In step 1606, the UE determines whether (i) X≤1, (ii) $\Sigma_L[X_{step} \cdot M_{S_{USS}(j)}^{(L)}] \leq M_{PDCCH}^{USS}$, and (iii) $[X_{step} \cdot C(V_{CCE}(S_{USS}(j)))] \leq C_{PDCCH}^{USS}$.

Upon determining that any of the three conditions are not satisfied, The UE in step 409 considers PDCCH allocation process ends, and UE decodes allocated PDCCH candidates in the slot or span.

Upon determining that all three conditions are satisfied, the UE in step 1608 allocates (additional) $\Sigma_L[Xstep \cdot M_{S_{USS}(j)}^{(L)}]$ PDCCH candidates for monitoring to USS set $S_{USS}(j)$. Thereafter, in step 1610, the UE updates remaining PDCCH candidates and non-overlapping CCEs, as described in Equation (8) and Equation (9), below. In step 1612, the UE updates USS set index, as described in Equation (10), below. In step 407, the UE determines whether j is equal to zero. When the UE determines that J does not equal to zero, the UE returns to step 403. Alternately, when the UE determines that j is equal to zero, then in step 408, the UE updates the scaling factor, as described in Equation (11). After updating the scaling factor the UE returns to step 403.

$$M_{PDCCH}^{USS} = M_{PDCCH}^{USS} - \Sigma_L[X_{step} \cdot M_{S_{USS}(j)}^{(L)}] \quad (8)$$

$$C_{PDCCH}^{USS} = C_{PDCCH}^{USS} - [Xstep \cdot C(V_{CCE}(S_{USS}(j)))] \quad (9)$$

$$j = \mod(j+1, K) \quad (10)$$

$$X = X + X_{step} \quad (11)$$

Upon determining that any of the three conditions of step 403 are not satisfied, The UE in step 409 considers PDCCH allocation process ends, and UE decodes allocated PDCCH candidates in the slot or span.

For example, when a UE determines that an initial number of PDCCH candidates for USS is $M_{PDCCH}^{USS} = \min(M_{PDCCH}^{max,slot,\mu}, M_{PDCCH}^{total,slot,\mu}) - M_{PDCCH}^{CSS} = 36$, after allocation to CSS, and the UE has 4 USS sets with {8, 16}, {8, 16}, and {8, 16} PDCCH candidates associated with two CCE ALs, for example CCE AL of 1 and 2 then, for accumulated scaling factor X=Xstep=0.25, the UE allocates PDCCH candidates {8, 16}*0.25={2, 4} to USS set 0 with remaining PDCCH candidates $M_{PDCCH}^{USS} = 36 - 6 = 30$, {2, 4} to USS set 1 with remaining PDCCH candidates $M_{PDCCH}^{USS} = 30 - 6 = 24$, {2, 4} to USS set 2 with remaining PDCCH candidates $M_{PDCCH}^{USS} = 24 - 6 = 18$, {2, 4} to USS set 3 with remaining PDCCH candidates $M_{PDCCH}^{USS} = 18 - 6 = 12$. For accumulated scaling factor X=0.5, UE allocates additional PDCCH candidates {2, 4} to USS set 0 with remaining PDCCH candidates $M_{PDCCH}^{USS} = 12 - 6 = 6$, additional {2, 4} to USS set 1 with remaining PDCCH candidates $M_{PDCCH}^{USS} = 6 - 6 = 0$. As $\Sigma_L[X_{step} \cdot M_{S_{USS}(j)}^{(L)}] = 6 > 0$, the UE finishes the PDCCH candidate allocation to USS sets. The resulting PDCCH candidate allocation is {4, 8}, {4, 8}, {2, 4}, {2, 4} for USS set 0, USS set 1, USS set 2, USS set 3, respectively.

As illustrated in FIG. 17, step 1702, describes a UE is provided with configuration of K USS sets and scaling factor update step, $X_{step}$. In step 1704, for a slot or a span, the UE sets a value of scaling factor X to 1 and j=0. In step 1706, the UE determines whether condition (1) j≠K and condition (2) X>0 are satisfied.

Upon determining that at least one condition of step 1706 is not satisfied, (such as if X≤0 or j=K) then in step 1718, the UE considers that the PDCCH candidates allocation process to USS sets ends and the UE monitors PDCCH according to the allocated PDCCH candidates in the slot or span.

Alternatively, upon determining that both conditions of 1706 are satisfied the UE starts or continues the allocation process for PDCCH candidates for the K USS sets by applying the scaling factor X (step 1708). That is, in step 1708, the UE first sets the remaining PDCCH candidates and non-overlapping CCEs associated with scaling factor X as $M_{PDCCH}^{(X)}=C_{PDCCH}^{USS}$ and $C_{PDCCH}^{(X)}=C_{PDCCH}^{USS}$, respectively, and j=0, where $M_{PDCCH}^{USS}$ and $C_{PDCCH}^{USS}$ are determined based on UE PDCCH monitoring capability and configured PDCCH candidates in CSS sets.

In step 1710, the UE determines whether for a current USS set $S_{USS}(j)$ it is $\Sigma_L[X \cdot M_{S_{USS}(j)}^{(L)}] \leq M_{PDCCH}^{(X)}$ and $[X \cdot C(V_{CCE}(S_{USS}(j)))] \leq C_{PDCCH}^{(X)}$. When the conditions of step 1710 are satisfied, in 1712 the UE in step 1712 (re)allocate $\Sigma_L[X \cdot M_{S_{USS}(j)}^{(L)}]$, PDCCH candidates for monitoring to USS set $S_{USS}(j)$. in step 1714 the UE updates remaining PDCCH candidates and non-overlapping CCEs, such that $M_{PDCCH}^{(X)}=M_{PDCCH}^{(X)}-\Sigma_L[X \cdot M_{S_{USS}(j)}^{(L)}]$, and $C_{PDCCH}^{(X)}=C_{PDCCH}^{(X)}-[X \cdot C(V_{CCE}(S_{USS}(j)))]$. Thereafter, in step 1716, the UE updates the USS set index, such that j=j+1.

When any of the conditions of step 1710 are not satisfied, then in step 1720, the UE ends the PDCCH candidate allocation process for the current scaling factor X and decreases the scaling factor such that $X=X-X_{step}$. After decreasing the scaling factor in step 1720, the method 1700 returns to step 1706 for the UE to check whether the two conditions (j≠K AND X>0) are satisfied.

For example, when a UE determines that an initial number of PDCCH candidates for USS is $M_{PDCCH}^{USS}=\min(M_{PDCCH}^{max,slot,\mu}, M_{PDCCH}^{max,slot,\mu})-M_{PDCCH}^{CSS}=36$, after allocation to CSS, and the UE has 4 USS sets with {8, 16}, {8, 16}, and {8, 16} PDCCH candidates associated with CCE ALs of {1, 2}. For scaling factor X=1, the UE can only allocate PDCCH candidates {8, 16} for USS set 0 with remaining PDCCH candidates $M_{PDCCH}^{(1)}=36-24=12$, the UE decreases X to 0.75. For scaling factor X=0.75, the UE can reallocate PDCCH candidates {6, 12} for USS set 0 with remaining PDCCH candidates $M_{PDCCH}^{(0.75)}=36-18=18$, and PDCCH candidates {6, 12} for USS set 1 with remaining PDCCH candidates $M_{PDCCH}^{(0.75)}=18-18=0$. The UE decreases X to 0.5. For scaling factor X=0.5, the UE reallocates PDCCH candidates {4, 8} for USS set 0 with remaining PDCCH candidates $M_{PDCCH}^{(0.5)}=36-12=24$, PDCCH candidates {4, 8} for USS set 1 with remaining PDCCH candidates $M_{PDCCH}^{(0.5)}=24-12=12$, and PDCCH candidates {4, 8} for USS set 2 with remaining PDCCH candidates $M_{PDCCH}^{(0.5)}=12-12=0$. The UE decreases X to 0.25. For scaling factor X=0.25, the UE reallocates PDCCH candidates {2, 4} for USS set 0 with remaining PDCCH candidates $M_{PDCCH}^{(0.25)}=36-6=30$, PDCCH candidates {2, 4} for USS set 1 with remaining PDCCH candidates $M_{PDCCH}^{(0.25)}=30-6=24$, PDCCH candidates {2, 4} for USS set 2 with remaining PDCCH candidates $M_{PDCCH}^{(0.25)}=24-6=18$, and PDCCH candidates {2, 4} for USS set 3 with remaining PDCCH candidates $M_{PDCCH}^{(0.25)}=18-6=12$. Eventually, UE allocates PDCCH candidates {2, 4}, {2,4}, {2,4}, and {2,4} for USS set 0, USS set 1, USS set 2, and USS set 3, respectively.

Another approach for dropping PDCCH candidates by scaling a number of PDCCH candidates across all search space sets where a UE is configured to monitor PDCCH according to USS, the UE applies PDCCH scaling for a USS set when the UE determines that a total number of configured PDCCH candidates for the search space set is larger than a remaining number of PDCCH candidates. Instead of dropping the entire search space set, the UE allocates partial PDCCH candidates, relative to the configured number of PDCCH candidates, for the search space set. The UE determines the allocated PDCCH candidates for K configured USS set(s) based on a predetermined PDCCH allocation or dropping syntax (5) below.

Syntax (5)

set j=0 while $\Sigma_L M_{S_{USS}(j)}^{(L)} \leq M_{PDCCH}^{USS}$ AND $C(V_{CCE}(S_{USS}(j))) \leq C_{PDCCH}^{USS}$ allocate $\Sigma_L M_{S_{USS}(j)}^{(L)}$ PDCCH candidates for monitoring to USS set $S_{USS}(j)$ $M_{PDCCH}^{USS}=M_{PDCCH}^{USS}-\Sigma_L M_{S_{USS}(j)}^{(L)}$;

$C_{PDCCH}^{USS}=C_{PDCCH}^{USS}-C(V_{CCE}(S_{USS}(j)))$;

j=j+1;

end while
set $X=1-X_{step}$ while $\Sigma_L[X \cdot M_{S_{USS}(j)}^{(L)}] > M_{PDCCH}^{USS}$ OR $[X \cdot C(V_{CCE}(S_{USS}(j)))] > C_{PDCCH}^{USS} X=X-X_{step}$;

end

As described in Syntax (5), a UE allocates $\Sigma_L[X \cdot M_{S_{USS}(j)}^{(L)}]$ PDCCH candidates for monitoring to USS set $S_{USS}(j)$. Additionally, $X_{step}$ is the updating step for the scaling factor 0<X≤1. $X_{step}$ can be provided to UE either by higher layer signalling or can be predefined in the specification of system operation. For example, $X_{step}=0.25$.

As illustrated in FIG. 18, step 1802, describes a UE being provided with a configuration of USS sets and an initial scaling factor updating step, $X_{step}$. In step 1804, for a slot or a span, the UE sets a value of USS index to 0, i.e. j=0. In step 1806, the UE determines for a current USS set, $S_{USS}(j)$, whether a first condition $\Sigma_L \cdot M_{S_{USS}(j)}(L) \leq M_{PDCCH}^{USS}$ and whether a second condition $C(V_{CCE}(S_{USS}(j))) \leq C_{PDCCH}^{USS}$ are satisfied. Upon determining that both conditions are satisfied, the UE in step 1808 allocates $\Sigma_L \cdot M_{S_{USS}(j)}^{(L)}$ PDCCH candidates for PDCCH monitoring to USS set $S_{USS}(j)$. In step 1810, the UE then updates a number of remaining PDCCH candidates and a number of remaining non-overlapping CCEs, such that Equation (12) and Equation (13) are satisfied. Then in step 1812, the UE increases a USS set index by 1, as described in Equation (14).

$$M_{PDCCH}^{USS}=M_{PDCCH}^{USS}-\Sigma_L \cdot M_{S_{USS}(j)}^{(L)} \quad (12)$$

$$C_{PDCCH}^{USS}=C_{PDCCH}^{USS}-C(V_{CCE}(S_{USS}(j))) \quad (13)$$

$$j=j+1 \quad (14)$$

When either of the conditions of step 1806 are not satisfied, the UE scales the number of configured PDCCH candidates for the current USS set, $S_{USS}(j)$, that do not yet have an allocation of PDCCH candidates. In step 1814, the UE sets $X=1-X_{step}$, $M_{PDCCH}^{(X)}=M_{PDCCH}^{USS}$, $C_{PDCCH}^{(X)}=C_{PDCCH}^{USS}$. In step 1816, the UE determines whether the conditions of Equations (15) and (16) are satisfied.

$$\Sigma_L[X \cdot M_{S_{USS}(j)}] \leq M_{PDCCH}^{(X)} \quad (15)$$

$$[X \cdot C(V_{CCE}(S_{USS}(j)))] \leq C_{PDCCH}^{(X)} \quad (16)$$

In response to determining that at least one of the conditions of step 1816 is not satisfied, the UE in step 1818, updates the scaling factor as described in Equation (17). Thereafter the method 1700 retunes to step 1816.

$$X=X-X_{step} \quad (17)$$

In response to determining that both conditions of step 1816 are satisfied, the UE in step 1820, allocates $\Sigma_L[X \cdot M_{S_{USS}(j)}^{(L)}]$ PDCCH candidates for monitoring to USS set $S_{USS}(j)$. In step 1822, the UE considers that the PDCCH allocation process ends and monitors PDCCH according to the allocated PDCCH candidates in the slot or span.

For example, when a UE determines that an initial number of PDCCH candidates for USS is $M_{PDCCH}^{USS}=(M_{PDCCH}^{max,slot,\mu}, M_{PDCCH}^{max,slot,\mu})-M_{PDCCH}^{CSS}=36$, after allocation to CSS, and the UE has 4 USS sets with {8, 16}, {8, 16}, and {8, 16} PDCCH candidates associated with CCE ALs of {1, 2}, the UE allocates {8, 16} to USS set 0 with remaining PDCCH candidates $M_{PDCCH}^{USS}=36-24=12$. As the UE cannot allocate X=100% configured PDCCH candidates for USS set 1, the UE then starts scaling the number of PDCCH candidates for USS set 1. When X=0.5, $\Sigma_L[X \cdot M_{S_{USS}(l)}^{(L)}]=12$, which is no larger than $M_{PDCCH}^{USS}=12$. The UE further allocates {4, 8} PDCCH candidates to USS set 1. The UE drops USS set 2 and USS set 3 for PDCCH monitoring for the corresponding slot or span.

Although FIGS. 16, 17, and 18 illustrate the methods 1600, 1700, and 1800, various changes may be made to FIGS. 16, 17, and 18. For example, while the method 1600 of FIG. 16 is shown as a series of steps, various steps could overlap, occur in parallel, occur in a different order, or occur multiple times. In another example, steps may be omitted or replaced by other steps. For example, steps of the method 1600 can be executed in a different order.

Embodiments of the present disclosure also describe a UE requested search space set switching. The following examples and embodiments describe UE requested search space set switching.

An embodiment of this disclosure considers switching between groups of search space sets based on a request by a UE. Based on the request, the UE can be triggered by a serving gNB to switch from current active search space sets to new active search space sets for PDCCH monitoring. The UE allocates PDCCH candidates to monitor for the active search space sets instead of all configured search space sets for the groups of search space sets.

For example, for group search space set switching, applicable groups of search space sets include only search space sets where a UE monitors PDCCH according to a USS. For another example, the applicable groups of search space sets include both search space sets where a UE monitors PDCCH according to a USS and search space sets where a UE monitors PDCCH according to a CSS. For yet another example, the applicable groups of search space sets are configured by higher layers. In the configuration of an applicable group of search space sets, a UE can be provided an associated group index for the search space sets.

A UE request for switching from a first group of search space sets to a second group of search space sets can be based on a signal-to-interference and noise ratio (SINR) measured by the UE in CORESETs of PDCCH receptions for the search space sets, or on block error rate (BLER) statistics for detection of DCI formats provided by PDCCH receptions, and so on. The different groups of search space sets can include a different number of PDCCH candidates per CCE aggregation level so that the UE can indicate a group of search space sets that includes more PDCCH candidates for CCE aggregation levels that the UE considers as appropriate to be used for PDCCH receptions. A serving gNB receiving the request from the UE can respond with an indication of a group of search space sets for the UE to monitor PDCCH by providing a corresponding group index, wherein the group index can be same as or different than an index for a current group of search space sets that the UE uses to monitor PDCCH.

Figure 19:
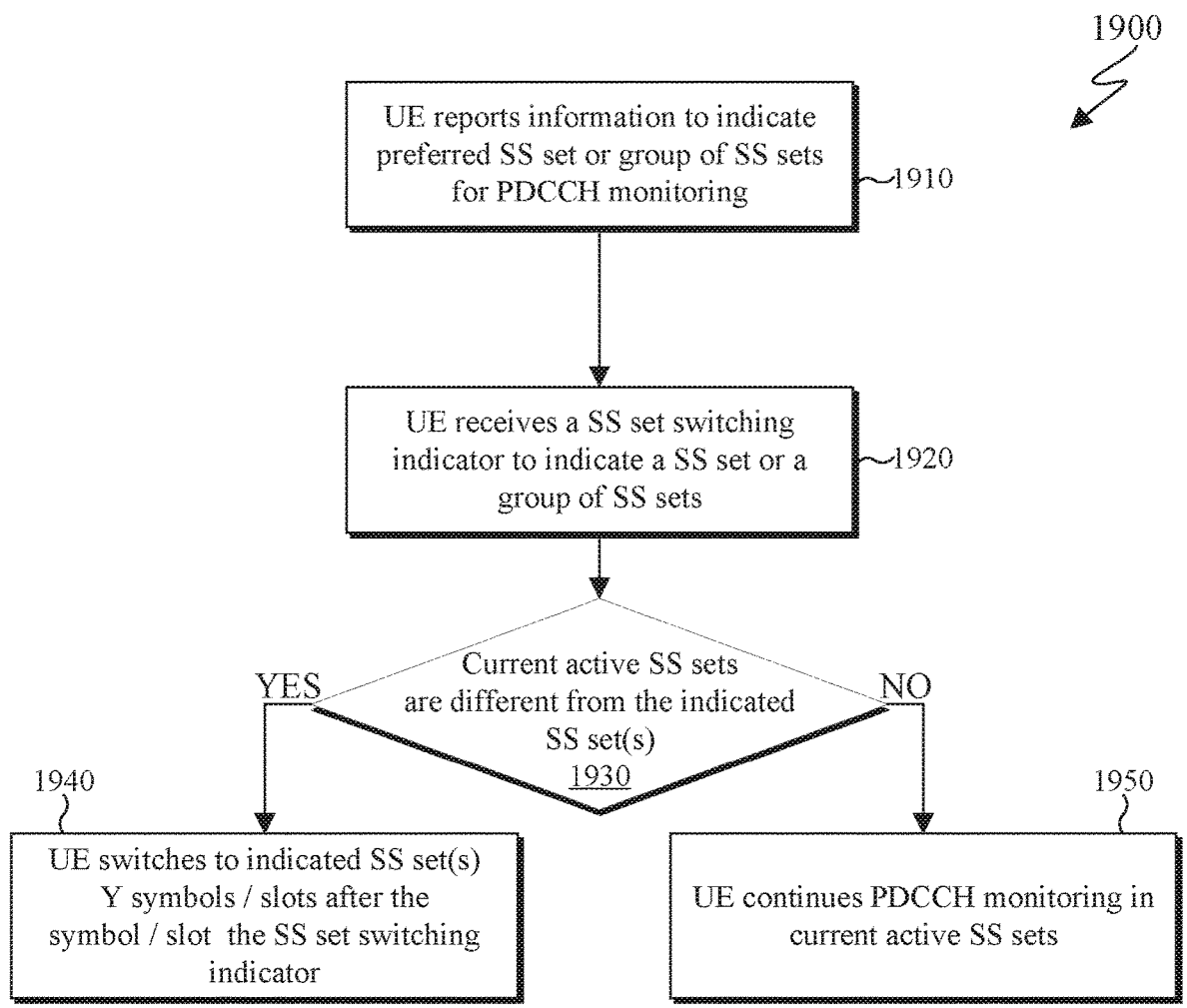
FIG. 19 illustrates an example method for a UE switching among groups of search space sets according to embodiments of the present disclosure.

FIG. 19 illustrates an example method 1900 for a UE switching among groups of search space sets based on a request by the UE according to embodiments of the present disclosure. For example, the steps of the method 1900 can be performed by any of the UEs 111-116 of FIG. 1, such as the UE 116 of FIG. 3. The method 1900 is for illustration only and other embodiments can be used without departing from the scope of the present disclosure.

As illustrated in FIG. 19, step 1910, describes a UE reporting information to indicate a preferred group of search space sets for PDCCH monitoring. In step 1920, the UE receives an index for a group of search space sets for PDCCH monitoring. The UE is configured the groups of search space sets in advance through higher layer signaling such as RRC signaling. In step 1930, the UE determines whether current active search space set(s) are same as indicated search space sets by determining whether the indicated index of a group of search space sets is same as (or different) than a current index of a group of search space sets for PDCCH monitoring. If current active search space set(s) are different from the indicated search space set(s), the UE, in step 1940, stops monitoring current active search space set(s) and starts monitoring PDCCH according to the search space set(s) corresponding to the indicated group index. For example, the PDCCH monitoring can start Y symbols/slots after the last symbol/slot when UE receives the PDCCH associated with the indication of a group index. Alternatively, if current active search space set(s) are the same as the indicated search space set(s), the UE, in step 1950, continues to monitor PDCCH according to the current active search space set(s).

In certain embodiments, a UE provides a request for a group of search space sets, from a configured set of groups of search space sets, by providing a corresponding index for the group. The group index can be indicated by $\log_2(N)$ bits where N is the number of groups of search space sets the UE is configured by higher layers. In a first example, the UE can provide the index through a MAC control element in a PUSCH transmission. In another example, the UE can provide the index through a PUCCH transmission where the UE can be configured a PUCCH resource, a periodicity, and a time offset relative to a first slot of a system frame number for the PUCCH transmission. In another example, the PUCCH resource can be same as a PUCCH resource for periodic or semi-persistent HARQ-ACK, or scheduling request, or CSI reporting and the group index indication can be multiplexed in the PUCCH transmission together with the other UCI information. A periodicity for multiplexing the group index can be same as or different than a periodicity for multiplexing the other UCI report in the PUCCH transmission.

Instead of providing an explicit indication for an index of a group of search space sets, the UE can be configured a mapping among indexes of groups of search space sets and RSRP values. After reporting an RSRP value, the UE can apply the corresponding group of search space sets for PDCCH monitoring after the UE detects a DCI format scheduling a transmission of a new transport block for a same HARQ process as for the transport block of the PUSCH transmission with the RSRP report. For example, for two groups of search space sets, the UE can be configured to associate the first group with an RSRP value that is smaller than or equal to a configured RSRP threshold (and to associate the second group with an RSRP value that is larger than the threshold).

A serving gNB (such as the BS 102) can provide to a UE (such as the UE 116) an index for a group of search space sets for the UE to monitor PDCCH either by a MAC control element in a PDSCH reception or by a field in a DCI format in a PDCCH reception. In this example, the UE can monitor PDCCH for detection of the DCI format either according to CSS or according to USS. The group index can be indicated by $\log_2(N)$ bits where N is the number of groups of search space sets the UE is configured by higher layers.

When a group index is provided to a UE through a MAC CE in a PDSCH reception, the UE can determine an application delay of Y symbols/slots for monitoring PDCCH according to an indicated group of search space sets to be after a last slot/symbol of PUCCH where UE transmits HARQ-ACK information in response to the reception of the PDSCH. When a group index is provided to a UE through a DCI format in a PDCCH reception, the UE can determine an application delay of Y symbols/slots for monitoring PDCCH according to an indicated group of search space sets to be Y slots/symbols after the last slot/symbol where the UE receives the PDCCH. The value of Y can be predetermined. In one example, the value of Y is provided to the UE through higher layer signalling. In another example, the value of Y can be reported by the UE as UE capability. In yet another example, the value of Y is defined in the specification of system operation. For example, Y=1 slot.

Although FIG. 19 illustrate the method 1900 various changes may be made to FIG. 19. For example, while the method 1900 of FIG. 19 is shown as a series of steps, various steps could overlap, occur in parallel, occur in a different order, or occur multiple times. In another example, steps may be omitted or replaced by other steps. For example, steps of the method 1900 can be executed in a different order.

Embodiments of the present disclosure describe PDCCH dropping per CCE AL. The following examples and embodiments describe PDCCH dropping per CCE AL.

An embodiment of this disclosure considers scaling or dropping of PDCCH candidates based on predetermined CCE AL order in a slot or a span. A UE (such as the UE 116) can be provided with a predetermined order of CCE ALs for allocating PDCCH candidates to monitor PDCCH for corresponding search space sets. The UE determines PDCCH candidates to allocated for search space sets in a slot/span based on the predetermined order of CCE ALs and PDCCH monitoring capability per slot/span. The UE can be provided with a list of CCE ALs, denoted as $L_{BD}$, and the predetermined order of CCE ALs is indicated by the index i of the list, $L_{BD}$. For example, the list can include the CCE ALs in the order of $\{2, 4, 8, 1, 16\}$.

For example, let $M_{PDCCH}^{USS}$ and $C_{PDCCH}^{USS}$ be the remaining PDCCH candidates and remaining non-overlapping CCEs for USS, respectively, after the UE allocates PDCCH candidates and non-overlapping CCEs to search space sets associated with PDCCH monitoring according to CSS. The UE determines the initial value of $M_{PDCCH}^{USS} = \min(M_{PDCCH}^{max,slot,\mu}, M_{PDCCH}^{max,slot,\mu}) - M_{PDCCH}^{CSS}$ and $C_{PDCCH}^{USS} = \min(C_{PDCCH}^{max,slot,\mu}, C_{PDCCH}^{total,slot,\mu}) - C_{PDCCH}^{CSS}$ and $C_{PDCCH}^{USS} = \min(C_{PDCCH}^{max,slot,\mu}, C_{PDCCH}^{total,slot,\mu}) - C_{PDCCH}^{CSS}$.

Denote by $V_{CCE}(S_{USS}(j))$ the set of non-overlapping CCEs for search space set $S_{USS}(j)$ and by $C(V_{CCE}(S_{USS}(j)))$ the cardinality of $V_{CCE}(S_{USS}(j))$. $M_{S_{USS}(j)}$ denotes the number of configured PDCCH candidate for search space set $S_{USS}(j)$ at CCE AL of L.

Denote by $V_{CCE}(S_{USS}(j))$ the set of non-overlapping CCEs for search space set $S_{USS}(j)$ at CCE AL $L_{BD}(i)$ and by $C(V_{CCE}(S_{USS}^{L_{BD}(i)}(j)))$ the cardinality of $V_{CCE}(S_{USS}^{L_{BD}(i)}(j))$. Denote by $M_{S_{USS}(j)}^{L_{BD}(i)}$ the PDCCH candidates for search space set $S_{USS}(j)$ at CCE AL $L_{BD}(i)$.

In a first approach for PDCCH allocation based on predetermined CCE AL order, a UE (such as the UE 116) applies the predetermined CCE AL order to all available USS sets where the non-overlapping CCEs for search space set $S_{USS}(j)$ at CCE aggregation level, $L_{BD}(i)$, are determined considering the allocated PDCCH candidates for monitoring for the CSS sets and the allocated PDCCH candidates for monitoring for all $L_{BD}(k)$, $0 \le k \le i$. The UE determines the allocated PDCCH candidates for K configured USS set(s) based on predetermined PDCCH allocation or dropping as described in Syntax (6), below.

Syntax (6)

Set i=0, j=0 while $M_{S_{USS}(j)}^{L_{BD}(i)} \le M_{PDCCH}^{USS}$ AND $C(V_{CCE}(S_{USS}^{L_{BD}(i)}(j))) \le C_{PDCCH}^{USS}$ allocate $M_{S_{USS}(j)}^{L_{BD}(i)}$ PDCCH candidates for monitoring to CCE AL $L_{BD}(i)$ of USS set $S_{USS}(j)$;

$M_{PDCCH}^{USS} = M_{PDCCH}^{USS} - M_{S_{USS}(j)}^{L_{BD}(i)}$;

$C_{PDCCH}^{USS} = C_{PDCCH}^{USS} - C(V_{CCE}(S_{USS}^{L_{BD}(i)}(j)))$;

j=mod(j+1,K);

if j=0 set i=i+1;

end if end while

In another approach for PDCCH allocation based on predetermined CCE aggregation level order, a UE applies the predetermined CCE aggregation level order to remaining search space sets without PDCCH allocation when the UE is not able to allocate all configured PDCCH candidates to the search space sets. The UE determines the allocated PDCCH candidates for K USS set(s) based on a predetermined PDCCH allocation or dropping as described in Syntax (7), below.

Syntax (7)

set j=0 while $\Sigma_L M_{S_{USS}(j)}^{(L)} \le M_{PDCCH}^{USS}$ AND $C(V_{CCE}(S_{USS}(j))) \le C_{PDCCH}^{USS}$ allocate $\Sigma_L M_{S_{USS}(j)}^{(L)}$ PDCCH candidates to USS set $S_{USS}(j)$ $M_{PDCCH}^{USS} = M_{PDCCH}^{USS} - \Sigma_L M_{S_{USS}(j)}^{(L)}$;

$C_{PDCCH}^{USS} = C_{PDCCH}^{USS} - C(V_{CCE}(S_{USS}(j)))$;

j=j+1;

end while set i=0, j0=j;

while $M_{S_{USS}(j)}^{L_{BD}(i)} \le M_{PDCCH}^{USS}$ AND $C(V_{CCE}(S_{USS}^{L_{BD}(i)}(j))) \le C_{PDCCH}^{USS}$ allocate $M_{S_{USS}(j)}^{L_{BD}(i)}$ PDCCH candidates to CCE AL $L_{BD}(i)$ of USS set $S_{USS}(j)$ $M_{PDCCH}^{USS} = M_{PDCCH}^{USS} - M_{S_{USS}(j)}^{L_{BD}(i)}$;

$C_{PDCCH}^{USS} = C_{PDCCH}^{USS} - C(V_{CCE}(S_{USS}^{L_{BD}(i)}(j)))$;

j=mod(j+1,K-j0)+j0;

if j=j0 set i=i+1;

end if end while

In yet another approach for PDCCH allocation based on a predetermined CCE AL order, a UE applies the predetermined CCE AL order only to a search space set with index j to remaining PDCCH candidates and non-overlapping CCEs after the UE allocates all configured PDCCH candidates and non-overlapping CCEs to search space sets with index smaller than j. The UE determines the allocated PDCCH candidates for USS set(s) based on predetermined PDCCH allocation or dropping described in Syntax (8), below.

Syntax (8)

set j=0 while $\Sigma_L M_{S_{USS(j)}}^{(L)} \leq M_{PDCCH}^{USS}$ AND $C(V_{CCE}(S_{USS}(j))) \leq C_{PDCCH}^{USS}$ allocate $\Sigma_L M_{S_{USS(j)}}$ PDCCH candidates for monitoring to USS set $S_{USS}(j)$ $M_{PDCCH}^{USS} = M_{PDCCH}^{USS} - \Sigma_L \cdot M_{S_{USS(j)}}^{(L)}$;

$C_{PDCCH}^{USS} = C_{PDCCH}^{USS} - C(V_{CCE}(S_{USS}(j)))$;

j=j+1;

end while
set i=0 while $M_{S_{USS(j)}}^{LBD(i)} \leq M_{PDCCH}^{USS}$ AND $C(V_{CCE}(S_{USS}^{LBD(i)}(j))) \leq C_{PDCCH}^{USS}$ allocate $M_{S_{USS(j)}}^{LBD(i)}$ PDCCH candidates for monitoring to CCE AL $L_{BD}(i)$ of
USS set $S_{USS}(j)$ $M_{PDCCH}^{USS} = M_{PDCCH}^{USS} - M_{S_{USS(j)}}^{LBD(i)}$;

$C_{PDCCH}^{USS} = C_{PDCCH}^{USS} - c(V_{CCE}(S_{USS}^{LBD(i)}(j)))$;

i=i+1;

end while

According to Syntax (6), Syntax (7), and Syntax (8), the UE initially allocates all configured PDCCH candidates and non-overlapping CCEs to USS sets based on legacy PDCCH allocation rule (after the UE has allocated PDCCH candidates and non-overlapping CCEs to CSS sets). Then, the UE allocates remaining PDCCH candidates and non-overlapping CCEs according to a set $L_{BD}$ of CCE ALs across USS sets to USS set $S_{USS}(j)$.

For determining the set $L_{BD}$ of CCE ALs, in one example $L_{BD}$ can be provided to UE through higher layer signaling. In another example, $L_{BD}$ can be predefined in the specification of system operation, such as $L_{BD}=[1, 2, 4, 8, 16]$. In yet another example, $L_{BD}$ can be reported from UE to gNB as assistance information by higher layer signalling. In yet another example, $L_{BD}$ can be preferred CCE ALs or PDCCH CSI reported by UE via a PUCCH or PUSCH.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for scheduling on multiple cells, the method comprising:
    receiving:
        first information for a set of M cells,
        second information for first search space sets for receptions of first physical downlink control channels (PDCCHs), and
        a first PDCCH from the first PDCCHs, wherein:
            the first PDCCH provides a first downlink control information (DCI) format, and
            the first DCI format schedules transmissions of first physical uplink shared channels (PUSCHs) on respective first cells from the set of M cells;
    determining that a transmission of a physical uplink control channel (PUCCH) with hybrid automatic repeat request acknowledgement (HARQ-ACK) information would overlap with transmissions of second PUSCHs, from the first PUSCHs, on respective second cells from the first cells; and
    transmitting the first PUSCHs on the respective first cells, wherein the HARQ-ACK information is included only in a PUSCH, from the second PUSCHs, that is transmitted on a cell with a smallest index from the second cells.

2. The method of claim 1, wherein the first DCI format includes an indicator field for scheduled cells and wherein a value of indicator field indicates the first cells.

3. The method of claim 2, wherein the indicator field for scheduled cells is located:
    second among fields in the first DCI format, and
    after an identifier field that identifies whether the first DCI format schedules transmissions of PUSCHs or receptions of physical downlink shared channels (PDSCHs).

4. The method of claim 1, further comprising:
receiving a second PDCCH, from the first PDCCHs, that provides a second DCI format that schedules transmissions of third PUSCHs on respective third cells from the set of M cells, wherein:
    a size of the first DCI format is same as a size of the second DCI format, and
    a number of the first cells is different than a number of the third cells.

5. The method of claim 1, further comprising:
receiving third information for search space sets for receptions of second PDCCHs, wherein:
    a PDCCH from the second PDCCHs provides a second DCI format,
    the second DCI format schedules a transmission of a second PUSCH on a first cell from the first cells,
    the first DCI format includes a first frequency domain resource allocation (FDRA) field that indicates first resource block groups (RBGs) for the transmission of a first PUSCH from the first PUSCHs on the first cell,
    the second DCI format includes a second FDRA field that indicates second RBGs for the transmission of the second PUSCH on the first cell, and a number of resource blocks (RBs) in an RBG from the first RBGs is larger than a number of RBs in an RBG from the second RBGs.

6. The method of claim 1, wherein:
the first DCI format includes a block of N values for a field,
the field corresponds to a parameter of a PUSCH from the first PUSCHs,
a number of the first PUSCHs is K,
K is smaller than or equal to N,
N is larger than 1 and N is smaller than M, and
K values from the block of N values have one-to-one mapping with the K PUSCHs.

7. The method of claim 6, wherein:
K is smaller than N, and
N-K values from the block of N values for the field are ignored.

8. A user equipment (UE), comprising:
a transceiver configured to receive:
first information for a set of M cells,
second information for first search space sets for receptions of first physical downlink control channels (PDCCHs), and
a first PDCCH from the first PDCCHs, wherein:
the first PDCCH provides a first downlink control information (DCI) format, and
the first DCI format schedules transmissions of first physical uplink shared channels (PUSCHs) on respective first cells from the set of M cells; and
a processor operably coupled to the transceiver, the processor configured to determine that a transmission of a physical uplink control channel (PUCCH) with hybrid automatic repeat request acknowledgement (HARQ-ACK) information would overlap with transmissions of second PUSCHs, from the first PUSCHs, on respective second cells from the first cells,
wherein the transceiver is further configured to transmit the first PUSCHs on the respective first cells and wherein the HARQ-ACK information is included only in a PUSCH, from the second PUSCHs, that is transmitted on a cell with a smallest index from the second cells.

9. The UE of claim 8, wherein the first DCI format includes an indicator field for scheduled cells and wherein a value of indicator field indicates the first cells.

10. The UE of claim 9, wherein the indicator field for scheduled cells is located:
second among fields in the first DCI format, and
after an identifier field that identifies whether the first DCI format schedules transmissions of PUSCHs or receptions of physical downlink shared channels (PDSCHs).

11. The UE of claim 8, wherein:
the transceiver is further configured to receive a second PDCCH, from the first PDCCHs, that provides a second DCI format that schedules transmissions of third PUSCHs on respective third cells from the set of M cells,
a size of the first DCI format is same as a size of the second DCI format, and
a number of the first cells is different than a number of the third cells.

12. The UE of claim 8, wherein:
the transceiver is further configured to receive third information for search space sets for receptions of second PDCCHs,
a PDCCH from the second PDCCHs provides a second DCI format, the second DCI format schedules a transmission of a second PUSCH on a first cell from the first cells,
the first DCI format includes a first frequency domain resource allocation (FDRA) field that indicates first resource block groups (RBGs) for the transmission of a first PUSCH from the first PUSCHs on the first cell,
the second DCI format includes a second FDRA field that indicates second RBGs for the transmission of the second PUSCH on the first cell, and
a number of resource blocks (RBs) in an RBG from the first RBGs is larger than a number of RBs in an RBG from the second RBGs.

13. The UE of claim 8, wherein:
the first DCI format includes a block of N values for a field,
the field corresponds to a parameter of a PUSCH from the first PUSCHs,
a number of the first PUSCHs is K,
K is smaller than or equal to N,
N is larger than 1 and N is smaller than M, and
K values from the block of N values have one-to-one mapping with the K PUSCHs.

14. The UE of claim 13, wherein:
K is smaller than N, and
N-K values from the block of N values for the field are ignored.

15. A base station, comprising:
a transceiver configured to transmit:
first information for a set of M cells,
second information for first search space sets for receptions of first physical downlink control channels (PDCCHs), and
a first PDCCH from the first PDCCHs, wherein:
the first PDCCH provides a first downlink control information (DCI) format, and
the first DCI format schedules receptions of first physical uplink shared channels (PUSCHs) on respective first cells from the set of M cells; and
a processor operably coupled to the transceiver, the processor configured to determine that a reception of a physical uplink control channel (PUCCH) with hybrid automatic repeat request acknowledgement (HARQ-ACK) information would overlap with receptions of second PUSCHs, from the first PUSCHs, on respective second cells from the first cells,
wherein the transceiver is further configured to receive the first PUSCHs on the respective first cells and wherein the HARQ-ACK information is included only in a PUSCH, from the second PUSCHs, that is received on a cell with a smallest index from the second cells.

16. The base station of claim 15, wherein the first DCI format includes an indicator field for scheduled cells and wherein a value of indicator field indicates the first cells.

17. The base station of claim 16, wherein the indicator field for scheduled cells is located:
second among fields in the first DCI format, and
after an identifier field that identifies whether the first DCI format schedules transmissions of PUSCHs or receptions of physical downlink shared channels (PDSCHs).

18. The base station of claim 15, wherein:
the transceiver is further configured to transmit a second PDCCH, from the first PDCCHs, that provides a second DCI format that schedules receptions of third PUSCHs on respective third cells from the set of M cells,
a size of the first DCI format is same as a size of the second DCI format, and a number of the first cells is different than a number of the third cells.

19. The base station of claim 15, wherein:

the transceiver is further configured to transmit third information for search space sets for transmissions of second PDCCHs, a PDCCH from the second PDCCHs provides a second DCI format, the second DCI format schedules a reception of a second PUSCH on a first cell from the first cells, the first DCI format includes a first frequency domain resource allocation (FDRA) field that indicates first resource block groups (RBGs) for the reception of a first PUSCH from the first PUSCHs on the first cell, the second DCI format includes a second FDRA field that indicates second RBGs for the reception of the second PUSCH on the first cell, and a number of resource blocks (RBs) in an RBG from the first RBGs is larger than a number of RBs in an RBG from the second RBGs.

20. The base station of claim 15, wherein:

the first DCI format includes a block of N values for a field, the field corresponds to a parameter of a PUSCH from the first PUSCHs, a number of the first PUSCHs is K, K is smaller than or equal to N, N is larger than 1 and N is smaller than M, and K values from the block of N values have one-to-one mapping with the K PUSCHs.

\* \* \* \* \*